(12) United States Patent
Awoniyi-Oteri et al.

(10) Patent No.: US 12,074,709 B2
(45) Date of Patent: Aug. 27, 2024

(54) HYBRID AUTOMATIC REPEAT REQUEST (HARQ) FEEDBACK FOR DYNAMIC MULTI-SLOT PHYSICAL DOWNLINK SHARED CHANNEL (PDSCH)

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Peter Gaal, San Diego, CA (US); Iyab Issam Sakhnini, San Diego, CA (US); Junyi Li, Fairless Hills, PA (US); Juan Montojo, San Diego, CA (US); Aleksandar Damnjanovic, Del Mar, CA (US); Yan Zhou, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/404,991

(22) Filed: Aug. 17, 2021

(65) Prior Publication Data

US 2022/0321266 A1 Oct. 6, 2022

Related U.S. Application Data

(60) Provisional application No. 63/170,698, filed on Apr. 5, 2021.

(51) Int. Cl.
*H04L 1/16* (2023.01)
*H04L 1/1607* (2023.01)
(Continued)

(52) U.S. Cl.
CPC .......... *H04L 1/1678* (2013.01); *H04L 5/0055* (2013.01); *H04W 72/0446* (2013.01); *H04W 72/1273* (2013.01); *H04W 72/21* (2023.01)

(58) Field of Classification Search
CPC ................. H04L 1/1678; H04L 5/0055; H04L 1/1614; H04L 1/189; H04L 1/1896; H04L 5/0023;
(Continued)

(56) References Cited

U.S. PATENT DOCUMENTS

2020/0280397 A1* 9/2020 Gao ...................... H04L 5/0055
2020/0351060 A1* 11/2020 Liang ................... H04L 1/1848
(Continued)

OTHER PUBLICATIONS

Ericsson: "PDSCH/PUSCH Enhancements", 3GPP TSG-RAN WG1 Meeting #104-e, 3GPP Draft, R1-2101310, 3rd Generation Partnership Project (3GPP), Mobile Competence Centre, 650, Route Des Lucioles, F-06921 Sophia-Antipolis Cedex, France, vol. RAN WG1, No. Online, Jan. 25, 2021-Feb. 5, 2021, Jan. 19, 2021 (Jan. 19, 2021), 27 Pages, XP051971506, Solution C, p. 9-p. 10 p. 10, paragraph 2.3.3.

(Continued)

*Primary Examiner* — Hoang-Chuong Q Vu
(74) *Attorney, Agent, or Firm* — Patterson + Sheridan, LLP

(57) ABSTRACT

Techniques and apparatus for providing hybrid automatic repeat request (HARQ) feedback for multiple physical downlink shared channel (PDSCH) transmissions are described. One example technique involves receiving downlink control information (DCI) scheduling a plurality of downlink data transmissions across a plurality of slots. The plurality of downlink data transmissions are monitored across the plurality of slots. At least one HARQ feedback scheme for acknowledging the plurality of downlink data transmissions is determined. HARQ feedback for the plu- (Continued)

rality of downlink data transmissions is provided in accordance with the at least one HARQ feedback scheme.

30 Claims, 11 Drawing Sheets

(51) Int. Cl.
    *H04L 5/00*           (2006.01)
    *H04W 72/04*         (2023.01)
    *H04W 72/0446*      (2023.01)
    *H04W 72/12*         (2023.01)
    *H04W 72/1273*      (2023.01)
    *H04W 72/21*         (2023.01)

(58) Field of Classification Search
    CPC .............. H04L 5/0044; H04L 5/0053; H04W 72/0446; H04W 72/1273; H04W 72/21; H04W 72/23
    See application file for complete search history.

(56) References Cited

U.S. PATENT DOCUMENTS

| | | | | |
|---|---|---|---|---|
| 2021/0160879 A1* | 5/2021 | Lin | ............... | H04L 1/1854 |
| 2021/0314084 A1* | 10/2021 | Hwang | ............... | H04L 1/1854 |
| 2021/0345373 A1* | 11/2021 | Li | ............... | H04L 5/0053 |
| 2022/0095337 A1* | 3/2022 | Wang | ............... | H04W 72/23 |
| 2022/0116968 A1* | 4/2022 | Choi | ............... | H04W 72/1268 |
| 2022/0210800 A1* | 6/2022 | Babaei | ............... | H04L 5/0092 |
| 2022/0216955 A1* | 7/2022 | Kim | ............... | H04L 5/0092 |
| 2022/0217756 A1* | 7/2022 | Wu | ............... | H04L 5/0055 |
| 2022/0232555 A1* | 7/2022 | Taherzadeh Boroujeni | ............... | H04W 72/21 |
| 2022/0255706 A1* | 8/2022 | Song | ............... | H04W 72/0446 |
| 2022/0256586 A1* | 8/2022 | Zeng | ............... | H04L 5/0055 |
| 2022/0353019 A1* | 11/2022 | Li | ............... | H04L 1/1854 |
| 2022/0368465 A1* | 11/2022 | Wong | ............... | H04L 1/1621 |
| 2022/0393801 A1* | 12/2022 | Lei | ............... | H04L 5/0053 |
| 2022/0393803 A1* | 12/2022 | Chen | ............... | H04L 1/1861 |
| 2022/0393829 A1* | 12/2022 | Kim | ............... | H04L 1/18 |
| 2022/0416956 A1* | 12/2022 | Li | ............... | H04L 1/1864 |
| 2023/0016851 A1* | 1/2023 | Li | ............... | H04W 72/23 |
| 2023/0144815 A1* | 5/2023 | Li | ............... | H04L 1/1854 370/328 |
| 2023/0198679 A1* | 6/2023 | Bae | ............... | H04W 72/04 370/329 |
| 2023/0199766 A1* | 6/2023 | Li | ............... | H04L 1/1812 370/329 |
| 2024/0031082 A1* | 1/2024 | Gao | ............... | H04L 1/1864 |

OTHER PUBLICATIONS

International Search Report and Written Opinion—PCT/US2022/071497—ISA/EPO—Jun. 30, 2022.
OPPO: "Discussion on PDSCH/PUSCH Enhancements", 3GPP TSG RAN WG1 #104-e, 3GPP Draft, R1-2100153, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, (Jan. 18, 2021), 5 Pages, XP051970271, Retrieved from the Internet: URL: https://ftp.3gpp.org/tsg_ran/WG1_RL1/TSGR1_104-e/Docs/R1-2100153.zip, R1-2100153.doc [retrieved on Jan. 18, 2021], p. 3.

* cited by examiner

HYBRID AUTOMATIC REPEAT REQUEST (HARQ) FEEDBACK FOR DYNAMIC MULTI-SLOT PHYSICAL DOWNLINK SHARED CHANNEL (PDSCH)

CROSS-REFERENCE TO RELATED APPLICATION

This application claims the benefit of and priority to U.S. Provisional Application No. 63/170,698, filed Apr. 5, 2021, which is assigned to the assignee hereof and hereby expressly incorporated by reference herein in its entirety.

INTRODUCTION

Aspects of the present disclosure relate to wireless communications, and more particularly, to techniques for providing hybrid automatic repeat request (HARQ) feedback for multiple physical downlink shared channel (PDSCH) transmissions across multiple slots.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method generally includes receiving, from a base station (BS), downlink control information (DCI) scheduling a plurality of downlink data transmissions across a plurality of slots. The method also includes monitoring for the plurality of downlink data transmissions across the plurality of slots and determining at least one hybrid automatic repeat request (HARQ) feedback scheme for acknowledging the plurality of downlink data transmissions. The method further includes providing HARQ feedback for the plurality of downlink data transmissions in accordance with the at least one HARQ feedback scheme.

One aspect provides an apparatus that includes (i) a memory comprising computer-executable instructions and (ii) one or more processors configured to execute the computer-executable instructions and to cause the apparatus to perform a method. The method generally includes receiving, from a BS, DCI scheduling a plurality of downlink data transmissions across a plurality of slots. The method also includes monitoring for the plurality of downlink data transmissions across the plurality of slots and determining at least one HARQ feedback scheme for acknowledging the plurality of downlink data transmissions. The method further includes providing HARQ feedback for the plurality of downlink data transmissions in accordance with the at least one HARQ feedback scheme.

One aspect provides an apparatus. The apparatus includes means for receiving, from a BS, DCI scheduling a plurality of downlink data transmissions across a plurality of slots. The apparatus also includes means for monitoring for the plurality of downlink data transmissions across the plurality of slots and determining at least one HARQ feedback scheme for acknowledging the plurality of downlink data transmissions. The apparatus further includes means for providing HARQ feedback for the plurality of downlink data transmissions in accordance with the at least one HARQ feedback scheme.

One aspect provides a non-transitory computer-readable medium comprising computer-executable instructions that, when executed by one or more processors of a processing system, cause the processing system to perform a method. The method generally includes receiving, from a BS, DCI scheduling a plurality of downlink data transmissions across a plurality of slots. The method also includes monitoring for the plurality of downlink data transmissions across the plurality of slots and determining at least one HARQ feedback scheme for acknowledging the plurality of downlink data transmissions. The method further includes providing HARQ feedback for the plurality of downlink data transmissions in accordance with the at least one HARQ feedback scheme.

One aspect provides a method for wireless communications by a BS. The method generally includes transmitting, to a UE, DCI scheduling a plurality of downlink data transmissions across a plurality of slots. The method also includes determining at least one HARQ feedback scheme for acknowledging the plurality of downlink data transmission. The method further includes monitoring for HARQ feedback for the plurality of downlink data transmissions in accordance with the at least one HARQ feedback scheme.

One aspect provides an apparatus that includes (i) a memory comprising computer-executable instructions and (ii) one or more processors configured to execute the computer-executable instructions and to cause the apparatus to perform a method. The method generally includes transmitting, to a UE, DCI scheduling a plurality of downlink data transmissions across a plurality of slots. The method also includes determining at least one HARQ feedback scheme for acknowledging the plurality of downlink data transmission. The method further includes monitoring for HARQ feedback for the plurality of downlink data transmissions in accordance with the at least one HARQ feedback scheme.

One aspect provides an apparatus. The apparatus includes means for transmitting, to a UE, DCI scheduling a plurality of downlink data transmissions across a plurality of slots. The apparatus also includes means for determining at least one HARQ feedback scheme for acknowledging the plurality of downlink data transmission. The apparatus further includes means for monitoring for HARQ feedback for the plurality of downlink data transmissions in accordance with the at least one HARQ feedback scheme.

One aspect provides a non-transitory computer-readable medium comprising computer-executable instructions that, when executed by one or more processors of a processing system, cause the processing system to perform a method. The method generally includes transmitting, to a UE, DCI scheduling a plurality of downlink data transmissions across a plurality of slots. The method also includes determining at least one HARQ feedback scheme for acknowledging the plurality of downlink data transmission. The method further includes monitoring for HARQ feedback for the plurality of downlink data transmissions in accordance with the at least one HARQ feedback scheme.

By way of example, an apparatus may comprise a processing system, a device with a processing system, or processing systems cooperating over one or more networks. The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
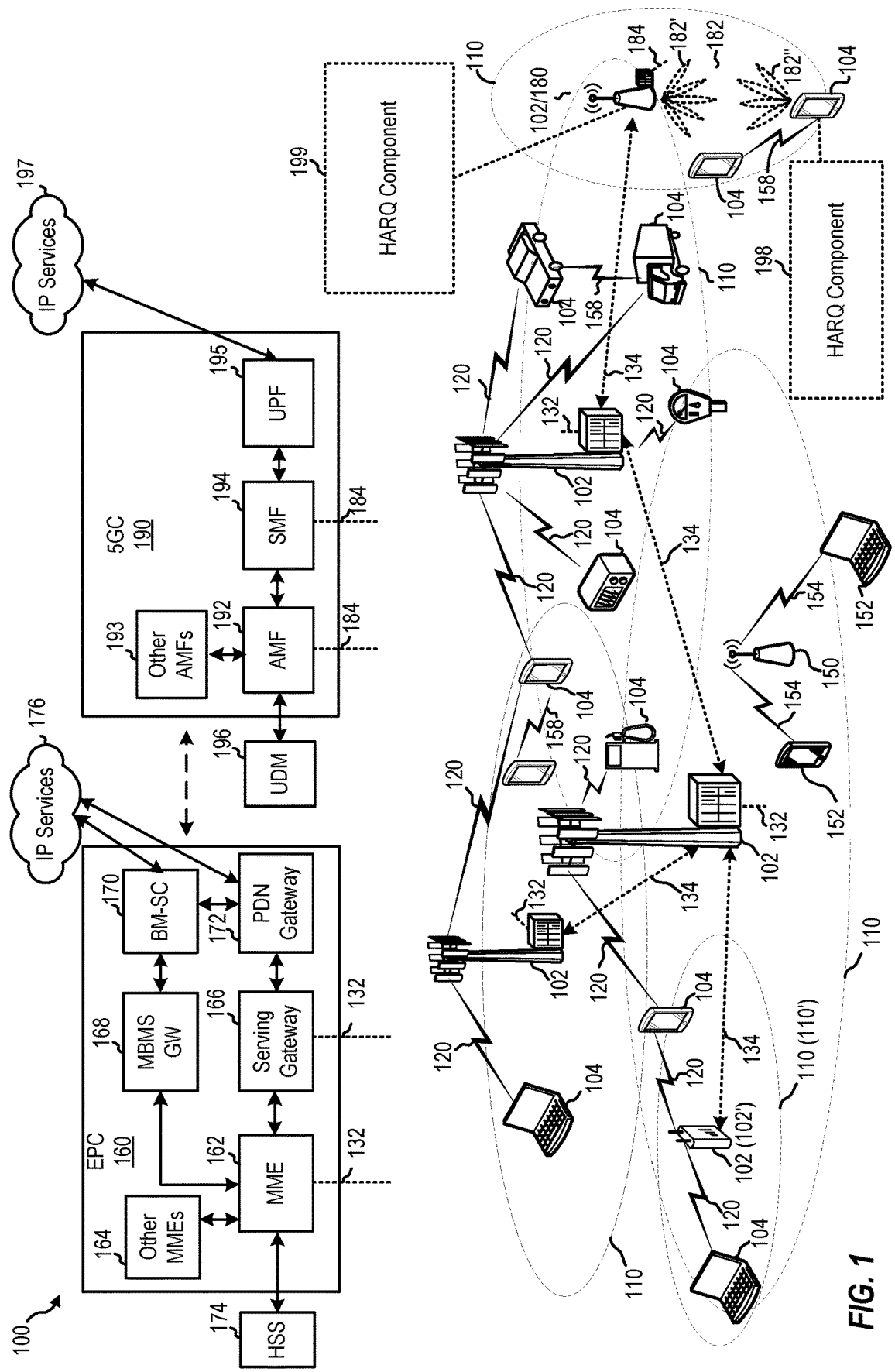
FIG. 1 is a block diagram conceptually illustrating an example wireless communication network.

Aspects of the present disclosure provide apparatuses, methods, processing systems, and computer-readable mediums for providing HARQ feedback for multiple PDSCH transmissions across multiple slots in higher frequency ranges (e.g., frequency range 2+ (FR2+) in 5G). Though certain aspects are described with respect to a particular frequency range in 5G, it should be noted that the aspects herein may be applied to other frequency ranges.

Wireless communication systems may support communications in operating bands located in different frequency ranges (FRs). For example, 5G NR may support one or more operating bands in a frequency range 1 (FR1) and one or more operating bands in a frequency range 2 (FR2). In 5G, FR1 may be approximately between 410 megahertz (MHz)-7.125 gigahertz (GHz) and FR2 may be approximately between 24.25 GHz-52.6 GHz.

As demand for mobile broadband access continues to increase, certain wireless communication systems may support communications in higher frequency ranges compared to FR1 and FR2. As an example, Release 17 of 5G NR may support one or more operating bands in a frequency range 2+(FR2+), which may include frequencies in the 56 GHz band and/or 71 GHz band. To support communications in such higher frequency bands, wireless communication systems may use a higher subcarrier spacing than the subcarrier spacings used in lower frequency bands. In FR2+, for example, 5G NR may use subcarrier spacings of 480 kilohertz (KHz), 960 KHz, etc., compared to a subcarrier spacing of 120 KHz used for lower frequency ranges.

In some cases, however, the higher subcarrier spacing can impact the UE and gNB timeline, which in turn can impact the HARQ timeline and feedback from the UE. For example, the time durations in which the UE and gNB have to process communications may decrease as the subcarrier spacing supported by the communication system is increased. These smaller time durations, in turn, can increase the complexity of the HARQ timeline and feedback supported by the communication system, increasing latency, reducing performance, reducing efficiency, etc.

To address issues (e.g., higher processing complexity, additional scheduling for downlink data) arising from the reduced UE and gNB timelines associated with using higher subcarrier spacing, some wireless communications may support multiple transmissions of PDSCH over multiple slots (referred to herein as multi-slot PDSCH). In multi-slot PDSCH, a single scheduling downlink control information (DCI) can be used to schedule a PDSCH in each slot of multiple different slots. Each PDSCH may include one or more transmit blocks (also referred to as transmission blocks) (TBs).

As impacts to the UE and gNB timeline can in turn impact the HARQ timeline and feedback, a technical problem exists in how to efficiently provide HARQ feedback to the network (e.g., gNB). Moreover, in cases where multiple PDSCHs are scheduled via a single scheduling DCI as opposed to multiple DCIs, such a technical problem can be amplified since conventional HARQ feedback schemes for providing HARQ feedback for multiple PDSCHs can lead to inefficient use of resources, increased latency, etc.

To address this, aspects provide techniques that enable devices (e.g., gNB and/or UE) to support one or more different HARQ feedback schemes, based on one or more conditions. Each of the HARQ feedback schemes may allow for providing HARQ feedback for multiple PDSCHs in an efficient manner. For example, one or more of the HARQ feedback schemes may allow for reducing interference, improving spectral efficiency, reducing overhead in the case of retransmission(s), etc.

In one aspect, the HARQ feedback scheme can involve using a single physical uplink control channel (PUCCH) resource for the HARQ feedback. In one aspect, the HARQ feedback scheme can involve using an encoding scheme for the HARQ feedback. In one aspect, the HARQ feedback scheme can involve using at least one of a single PUCCH resource or an encoding scheme for providing the HARQ feedback.

As described in more detail below, the UE and gNB may determine the particular HARQ feedback scheme for providing HARQ feedback for multiple PDSCHs, based on condition(s), such as time arrival of PDSCHs, priority associated with PDSCHs, modulation and coding scheme (MCS) associated with PDSCHs, etc. In some cases, the UE and gNB can determine to apply different HARQ feedback schemes to different subsets of PDSCHs scheduled by a single scheduling DCI, based on the condition(s). The gNB may provide an indication of the HARQ feedback scheme(s) for the UE to use for providing HARQ feedback.

Additionally, aspects provide techniques that enable devices (e.g., gNB and/or UE) to process retransmission(s) of one or more of the PDSCHs, based on the one or more conditions. As described in more detail below, for example, the UE and gNB may process retransmission(s) of one or more of the PDSCHs, based on the particular HARQ feedback scheme used for the respective PDSCHs.

In this manner, aspects can enable HARQ feedback to be sent for multiple PDSCHs in an efficient manner. This in turn can significantly improve network performance in cases where reduced timelines (e.g., due to using higher subcarrier spacings for higher frequency ranges) impacts the HARQ timeline and feedback of the wireless communication system.

Introduction to Wireless Communication Networks

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes HARQ component 199, which may be configured to determine at least one HARQ feedback scheme for acknowledging multiple downlink data transmissions (e.g., PDSCHs) scheduled by a single DCI and monitor for HARQ feedback for the multiple downlink data transmissions, in accordance with the at least one HARQ feedback scheme. Wireless network 100 further includes HARQ component 198, which may be configured to determine at least one HARQ feedback scheme for acknowledging multiple downlink data transmissions scheduled by a single DCI and provide HARQ feedback for the multiple downlink data transmissions in accordance with the at least one HARQ feedback scheme.

Figure 2:
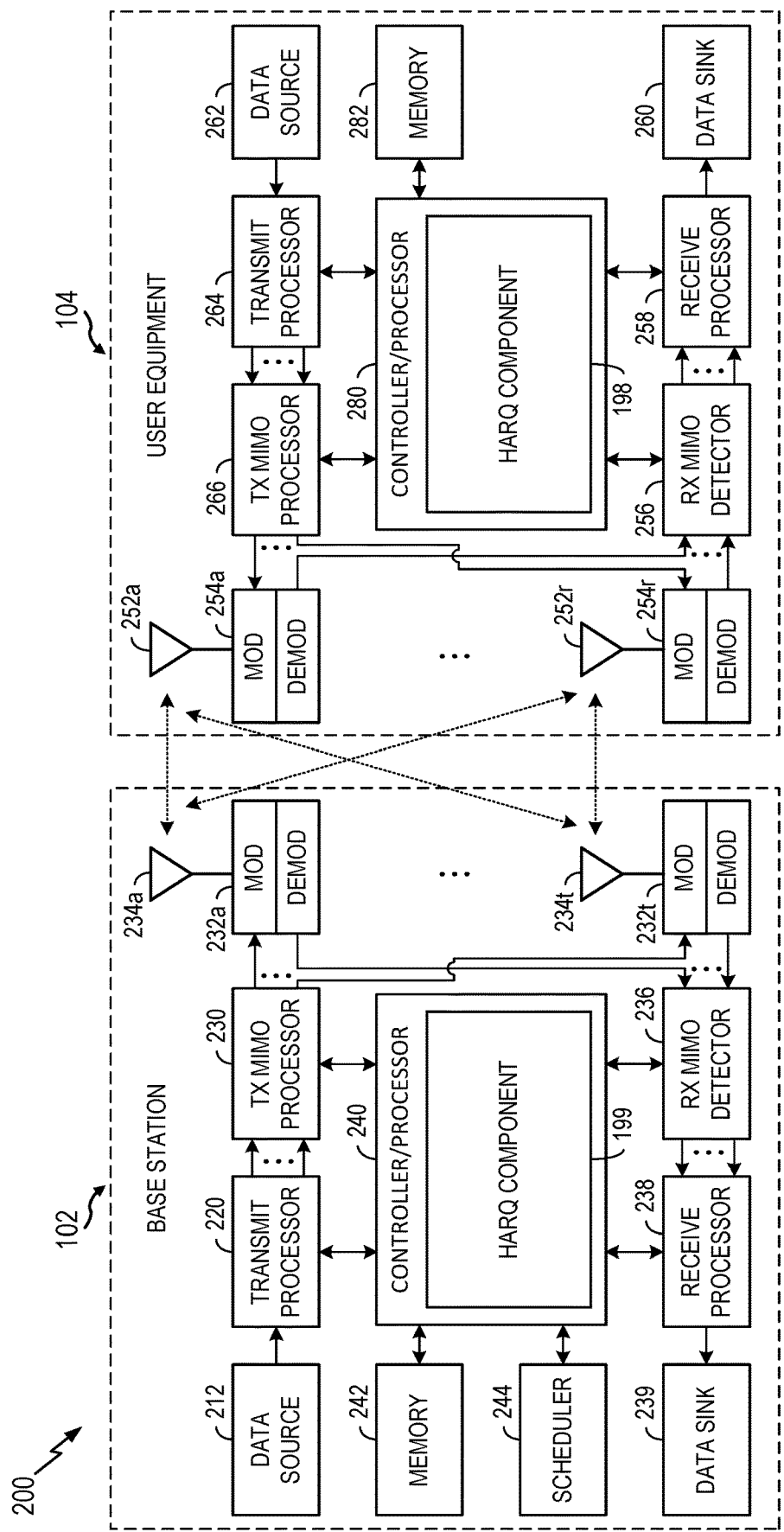
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes HARQ component 199. Notably, while depicted as an aspect of controller/processor 240, HARQ component 199 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes HARQ component 198. Notably, while depicted as an aspect of controller/processor 280, HARQ component 198 may be implemented additionally or alternatively in various other aspects of user equipment 104 in other implementations.

Figure 3:
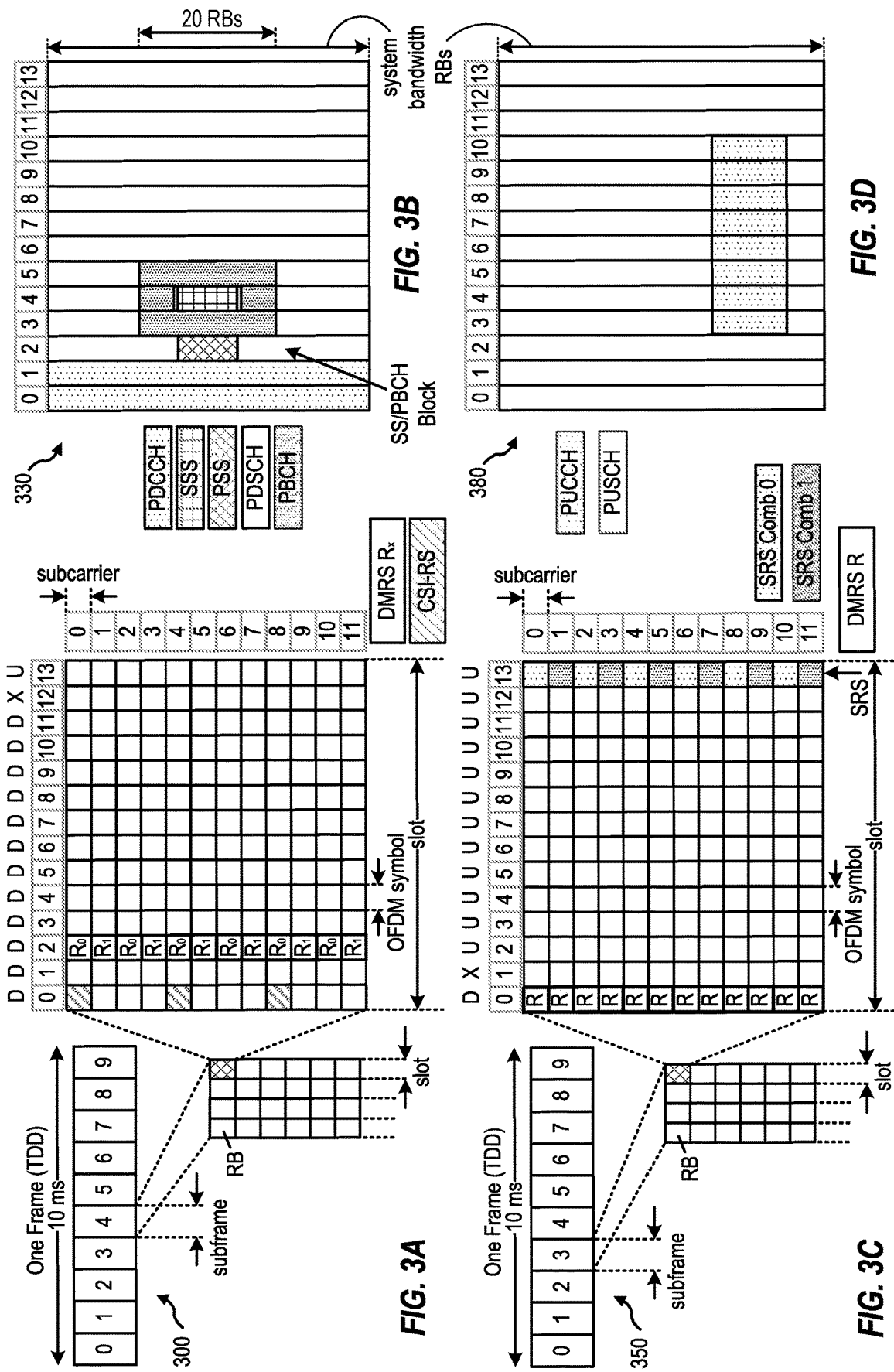
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Further, as described herein, some wireless communication systems (e.g., Release 17 5G) may support communications in frequency bands higher than FR2, such as FR2+. In some cases, the FR2+ may include frequencies in the 56 GHz band and/or 71 GHz band. In some aspects, the techniques described herein for providing HARQ feedback can be used in wireless communication systems that support communications in these higher frequencies.

Example HARQ Feedback for Multi-Slot PDSCH

Figure 4:
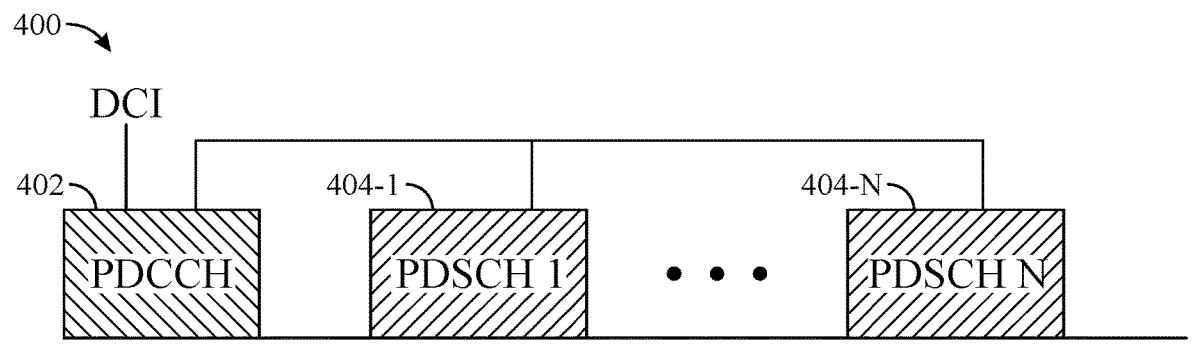
FIG. 4 depicts an example multi-slot PDSCH scheme.

As noted above, some communication systems may support multi-slot PDSCH to address some of the issues associated with reduced timelines caused by higher subcarrier spacings. FIG. 4 depicts an example multi-slot PDSCH scheme 400, in which a single DCI is used to schedule multiple PDSCH transmissions 404-1 to 404-N across multiple slots. The DCI can be included within physical downlink control channel (PDCCH) 402. In one reference example, each PDSCH 404 1-N can be scheduled for a different slot.

Figure 5:
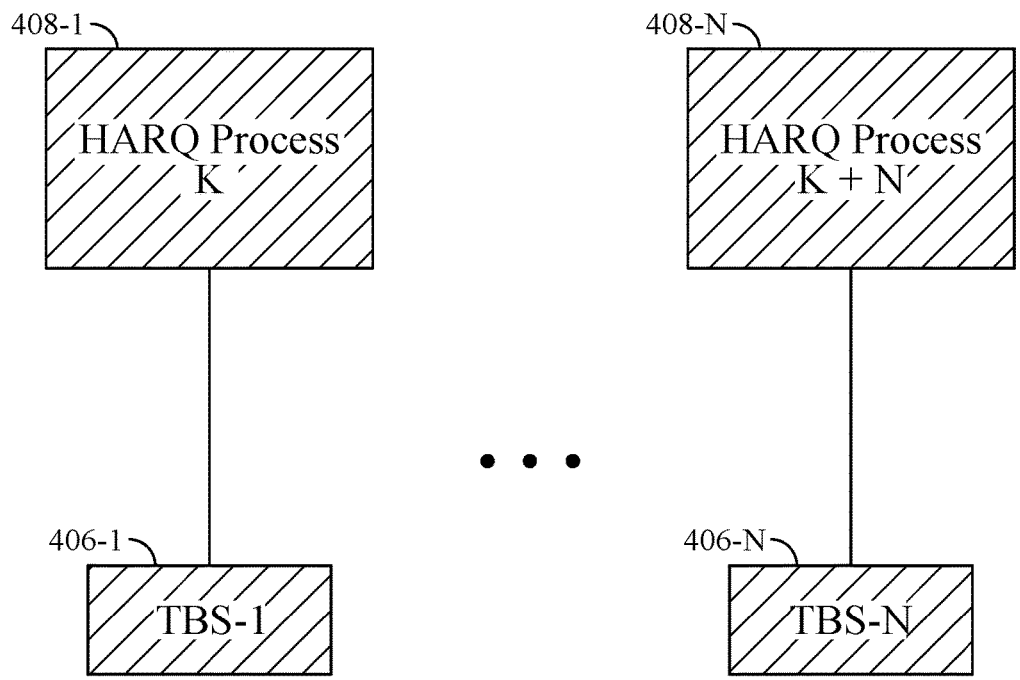
FIG. 5 depicts an example of HARQ processes provided for multiple PDSCHs.

Each PDSCH 404 may include a separate HARQ process for transmitting HARQ feedback for TB(s) within the PDSCH 404. As shown in FIG. 5, for example, assuming each PDSCH 404 1-N includes a single TB 406, a different HARQ process 408 can be provided for each TB 406, resulting in N HARQ processes for N TBs (within N PDSCHs).

While each HARQ process 408 1-N can be used to transmit a HARQ feedback for the respective TB 406 1-N within the respective PDSCH 404 1-N, transmitting HARQ feedback in this manner can lead to inefficient use of resources and reduce network performance. Accordingly, it may be desirable to provide improved techniques for providing HARQ feedback for multi-slot PDSCH.

Aspects Related to Improved HARQ Feedback for Multi-Slot PDSCH

Aspects presented herein provide improved techniques for providing HARQ feedback for multiple PDSCHs scheduled by a single DCI. In some aspects, the techniques described herein can be used when communications are deployed in higher frequency ranges, such as FR2+. Note, however, that FR2+ is used as a reference example and that the techniques described herein can be used for any set of operating bands in which the numerology (e.g., subcarrier spacing) for that set of operating bands has an impact on the UE and gNB processing timeline (e.g., reduces the processing timeline).

Figure 6:
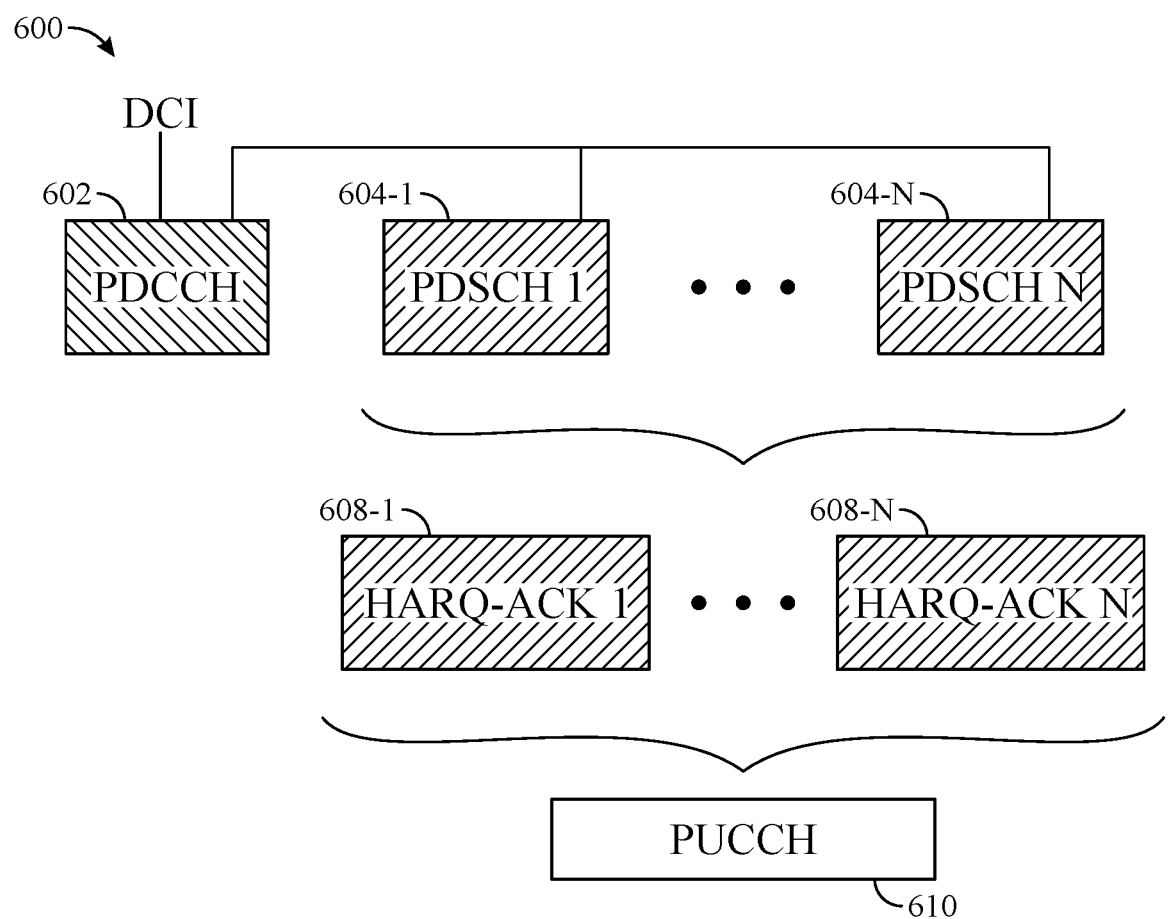
FIG. 6 depicts an example HARQ feedback scheme, in accordance with certain aspects of the present disclosure.

In order to support providing efficient HARQ feedback for multiple PDSCHs scheduled by a single DCI, aspects provide different HARQ feedback schemes that can be used for providing the HARQ feedback. FIG. 6 depicts an example HARQ feedback scheme 600, in accordance with certain aspects of the present disclosure. Here, each PDSCH 604 1-N is scheduled by a single PDCCH 602. A TB may be transmitted in each PDSCH 604. Each PDSCH 604 1-N may include an assigned HARQ process (e.g., similar to HARQ process 408) for providing feedback (e.g., acknowledgment (ACK) or negative acknowledgement (NACK)) for the PDSCH 604 to the network. As used herein, the HARQ feedback scheme 600 may be referred to as a block (or group) of individual HARQ-ACKs.

In some aspects, the HARQ feedback scheme 600 enables the UE to provide HARQ feedback for all of the PDSCHs 604 1-N in a group, instead of providing separate HARQ feedback for each PDSCH 604 (based on the separate HARQ processes). For example, in the HARQ feedback scheme 600, a UE can use a single PUCCH resource (which may span one or more symbols) to send the individual HARQ feedbacks as a group to the network. As shown in FIG. 6, each individual HARQ-ACK 608 1-N (corresponding to PDSCHs 604 1-N, respectively) can be sent within a single PUCCH resource 610. In one aspect, the HARQ-ACKs 608 1-N can be multiplexed within the PUCCH resource 610. By sending the HARQ-ACKs 608 1-N as a group within a single PUCCH resource 610, aspects can reduce interference and improve spectral efficiency, due in part, e.g., to the reduction in the number of feedback transmissions.

In the HARQ feedback scheme 600, since individual HARQ-ACKs are still sent (but within a single PUCCH resource instead of multiple PUCCH resources), retransmission(s) of one or more of the PDSCHs 604 can be sent individually. To reduce overhead in the case of multiple retransmissions, the gNB can choose to use the same scheduling DCI (e.g., within PDCCH 602) to retransmit the multiple HARQ processes.

Figure 7:
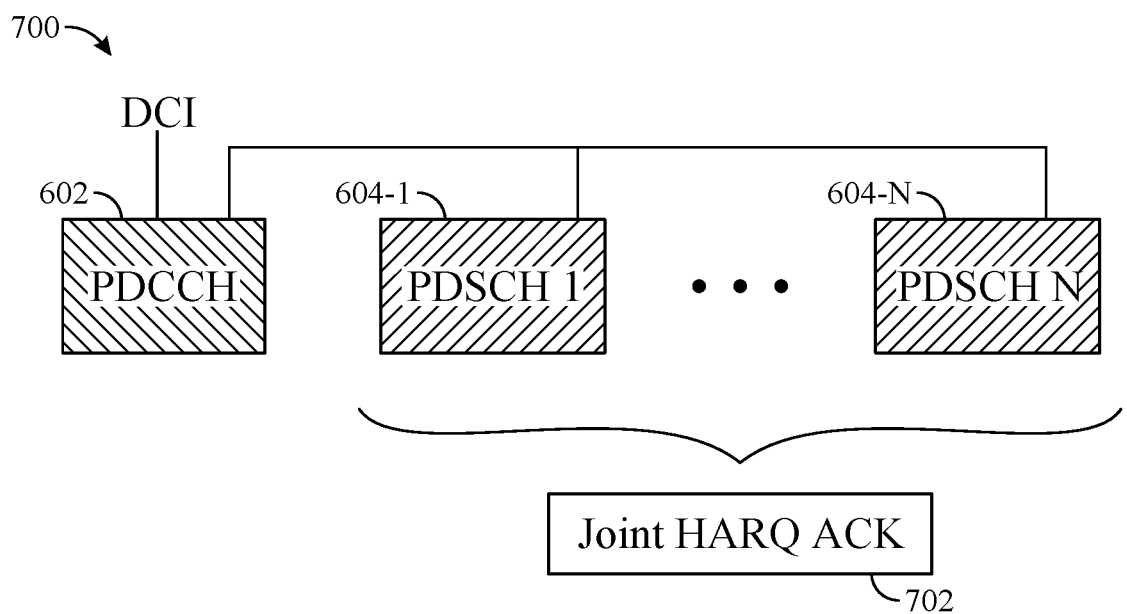
FIG. 7 depicts another example HARQ feedback scheme, in accordance with certain aspects of the present disclosure.

FIG. 7 depicts an example HARQ feedback scheme 700, in accordance with certain aspects of the present disclosure. As used herein, the HARQ feedback scheme 700 may be referred to as a joint (or compressed) HARQ ACK. In some aspects, the HARQ feedback scheme 700 enables the UE to provide a joint (or compressed) HARQ feedback for all of the PDSCHs 604 1-N. For example, in the HARQ feedback scheme 700, the UE can use an encoding scheme to jointly encode the HARQ-ACKs (e.g., HARQ-ACKs 608 1-N) for the PDSCHs 604 1-N into the joint HARQ-ACK 702.

The joint HARQ-ACK 702 may include a smaller amount of bits than the total number of bits for the HARQ-ACKs 608 1-N. For example, assuming each HARQ-ACK 608 is a single bit (for a total of N bits of HARQ feedback), the joint HARQ-ACK 702 may include N–X bits, where X≥1. In some aspects, waveform signatures can be used to multiplex the HARQ-ACKs 608 for the multiple PDSCHs 604 into the joint HARQ-ACK 702.

The encoding scheme that is used to jointly encode the HARQ-ACKs 608 1-N into the joint HARQ-ACK 702 can be based on different techniques. In one example, the encoding scheme can be based on whether at least one HARQ-ACK is a NACK. For instance, if at least one PDSCH is received in error, the joint HARQ-ACK 702 may indicate a NACK. On the other hand, the joint HARQ-ACK 702 may indicate ACK if none of the PDSCHs is received in error.

In another example, the encoding scheme can be used to indicate ACK/NACK as well as the number of PDSCHs with ACK/NACK. For instance, assuming there are two PDSCHs received in error, the joint HARQ-ACK 702 may indicate a NACK and indicate that there are two PDSCHs with NACK. Similarly, assuming there are two PDSCHs successfully received, the joint HARQ-ACK 702 may indicate ACK and indicate that there are two PDSCHs with ACK.

With the HARQ feedback scheme 700, the network can re-transmit some or all the data spanning the multiple PDSCHs with feedback in the joint HARQ-ACK 702. For example, if the joint HARQ-ACK 702 indicates a NACK without indicating the number of PDSCHs with NACK, the network may re-transmit all of the data spanning the multiple PDSCHs. In another example, if the joint HARQ-ACK 702 indicates NACK while indicating the number of PDSCHs with NACK, the network can re-transmit the subset of data corresponding to the PDSCHs with NACK.

Figure 8:
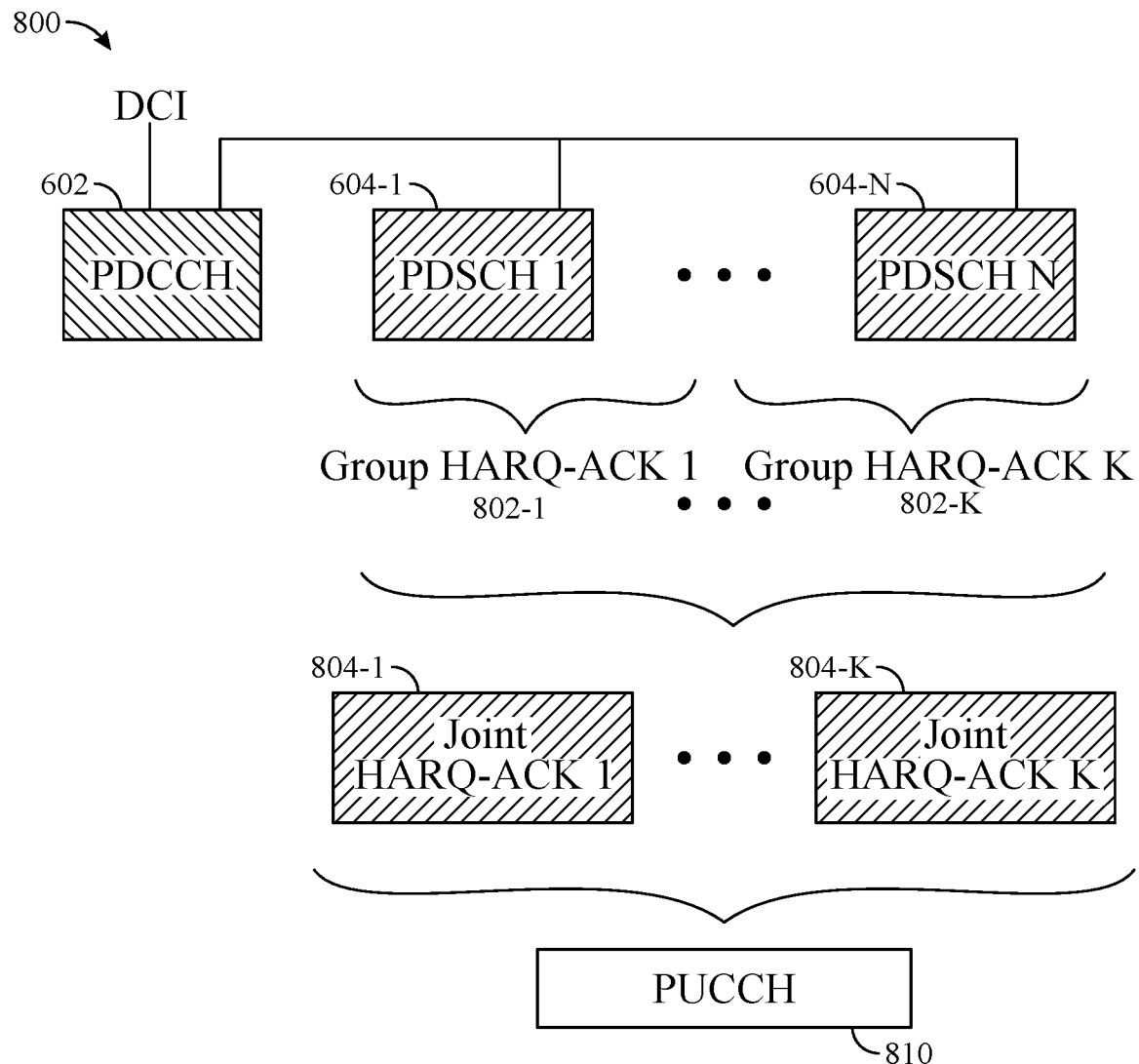
FIG. 8 depicts another example HARQ feedback scheme, in accordance with certain aspects of the present disclosure.

FIG. 8 depicts an example HARQ feedback scheme 800, in accordance with certain aspects of the present disclosure. As used herein, the HARQ feedback scheme 800 may be referred to as a joint-block HARQ ACK. For example, the HARQ feedback scheme 800 may be a combination of the HARQ feedback scheme 600 and the HARQ feedback scheme 700.

In some aspects, the HARQ feedback scheme 800 enables the UE to divide the N PDSCHs 604 into one or more groups 802 1-K (e.g., K groups as shown in FIG. 8) and generate one joint HARQ-ACK 804 for each group 802. The joint HARQ-ACK 804 may be similar to the joint HARQ-ACK 704 depicted in FIG. 7. For example, the joint HARQ-ACK 804 for each group 802 may be generated using the encoding scheme associated with the HARQ feedback scheme 700. In some aspects, the UE can transmit, as the HARQ feedback, the joint HARQ-ACK 804 for each group 802 to the network.

In some aspects, the joint HARQ-ACK 804 from each group 802 can be sent as a block of K joint HARQ-ACKs to the network. For example, the UE can multiplex the K joint HARQ-ACKs 804 1-K within a single PUCCH resource 810 in order to send the K joint HARQ-ACKs 804 1-K as a group to the network. With the HARQ feedback scheme 800, the network can retransmit the PDSCHs 604 within the same group 802 together. In cases where PDSCHs corresponding to multiple groups (e.g., multiple joint HARQ-ACKs) have to be retransmitted, the same scheduling DCI (e.g., PDCCH 602) can be used to schedule the retransmission(s).

For multiple PDSCHs scheduled by a single PDCCH (e.g., PDCCH 602), the gNB can choose to use a combination of: (1) individual HARQ-ACKs, (2) joint HARQ-ACKs (e.g., HARQ feedback scheme 700), (3) block individual HARQ-ACKs (e.g., HARQ feedback scheme 600), and (4) block joint HARQ-ACKs (e.g., HARQ feedback scheme 800). In some aspects, the gNB may determine the HARQ feedback scheme(s) for a given set of PDSCHs based on the set of available PUCCH resources. In some aspects, the gNB may determine the HARQ feedback scheme(s) for a given set of PDSCHs based on communication with the UE. For example, the UE may request that a particular HARQ feedback scheme be used for a set of PDSCHs. Note that in some cases, the use of joint HARQ-ACK or block HARQ-ACK may lead to out-of-order HARQ-ACKs. In these cases, the wireless communication system may support out-of-order HARQ ACKs.

For PDSCHs that use a joint HARQ-ACK (e.g., HARQ feedback scheme 700) or block HARQ-ACK (e.g., HARQ feedback scheme 600), the grouping of PDSCHs can be selected based on one or more criteria. In one aspect, the grouping of PDSCHs can be based on time arrival of PDSCHs at the UE. For example, PDSCHs using the joint/block HARQ-ACKs may be assembled based on the time arrival of the PDSCHs. In this example, for PDSCHs that are close to each other (e.g., time arrivals are within a threshold amount of time), the UE can use a joint HARQ to provide the HARQ feedback (e.g., HARQ feedback scheme 700) or transmit the HARQ-ACKs for the PDSCHs as a block (e.g., HARQ feedback scheme 600).

In one aspect, the grouping of PDSCHs can be based on priorities of the PDSCHs. For example, for PDSCHs that have the same priorities, the UE may send the HARQ feedback for the PDSCHs in the same block (e.g., HARQ feedback scheme 600) or in a joint HARQ-ACK (e.g., HARQ feedback scheme 700). In some cases, higher priority PDSCHs may be configured to use individual HARQ-ACKs while lower priority PDSCHs may use a joint HARQ-ACK. As a reference example, the prioritization (from highest to lowest) can include: (i) Priority 1, individual HARQ-ACK, (ii) Priority 2, block individual HARQ-ACK, (iii) Priority 3, joint HARQ-ACK, and (iv) Priority 4, block joint HARQ-ACK.

The priorities of the PDSCHs may be indicated in the scheduling DCI. The priorities may be set based on criteria, such as quality of service (QoS) requirements, where higher QoS requirements (e.g., voice) are given higher priorities and lower QoS requirements (e.g., video) are given lower priorities. Different QoS requirements may indicate different streams, e.g., video, audio, and data. PDSCHs that have the same QoS requirements or PDSCHs that are carried over the same logical channel may be given the same priorities.

In one aspect, the grouping of PDSCHs can be based on a type of transmission/reception architecture associated with the PDSCHs. For example, in some cases, the PDSCHs may be transmitted using a multiple transmission reception point (TRP), using multiple beams, and/or using multiple panels. In these cases, PDSCHs that are transmitted using a multi-TRP, multiple beams, and/or multiple panels can be grouped together.

In one aspect, the grouping of PDSCHs can be based on a MCS associated with the PDSCHs. For example, the grouping of PDSCHs can be based on the UE using the same MCS or code rate as the PDSCHs. In one aspect, the grouping of PDSCHs can be based on the number of spatial streams used for the PDSCHs. For example, for multiple layer transmissions, PDSCHs transmitted with the same layer can be grouped together. In one aspect, the grouping of PDSCHs can be based on whether the PDSCHs are transmitted in a multi-user setting. For example, in a multi-user setting, the PDSCHs for UEs with similar characteristics can be grouped together and multiplexed on the same PUCCH resource.

In some aspects, the network (e.g. gNB) can provide an explicit indication of which HARQ feedback scheme(s) the UE is to use to provide HARQ feedback for multiple PDSCHs scheduled by a same DCI. For example, the gNB can provide an indication in the scheduling PDCCH (e.g., PDCCH 602) of which HARQ feedback scheme to use for the HARQ feedback for the PDSCHs. In some cases, the indication in the scheduling PDCCH may be a fixed length indication. For example, the gNB can preconfigure the different HARQ feedback schemes via radio resource control (RRC) signaling and send indices of the particular HARQ feedback scheme(s) the UE is to use in the scheduling PDCCH. In some cases, one index can be sent for the multiple PDSCHs to reduce the length.

In some aspects, the HARQ feedback scheme(s) the UE uses to provide HARQ feedback for multiple PDSCHs scheduled by the same DCI may be preconfigured for the UE. For example, the network can preconfigure certain PDSCH indexes to use a particular HARQ feedback scheme. In another example, the network can preconfigure PDSCHs with specific characteristics (e.g., MCS, number of layers, type of transmit beam, type of transmit and reception architecture, panel(s), etc.) to use a particular HARQ feedback scheme. The pre-configuration may be communicated to the UE a priori, e.g., via RRC signaling. When the UE detects the characteristics of the PDSCHs or determines the particular PDSCH index, the UE can use the preconfigured HARQ feedback scheme to provide HARQ feedback for the PDSCHs.

In some aspects, the network (e.g., gNB) can provide an implicit indication of which HARQ feedback scheme(s) the UE is to use to provide HARQ feedback for multiple PDSCHs scheduled by the same DCI. For example, a PDSCH with multiple repetitions (e.g., greater than a threshold number of repetitions) may indicate to the UE that a HARQ feedback scheme that is reliability sensitive should be used for providing feedback for that PDSCH. In this instance, the UE may determine to use a HARQ feedback scheme that does not employ compression or grouping. In another example, a PDSCH with repetitions less than a threshold number of repetitions may indicate to the UE that an efficient HARQ feedback scheme can be used to provide HARQ feedback. In this instance, the UE may determine to use one of the HARQ feedback schemes 600, 700, and 800. In some aspects, the number of transmission configuration indicator (TCI) states used for PDSCH with repetition can indicate how reliability sensitive the upper layer (e.g., application) is and which HARQ feedback scheme should be used.

In some cases, the UE may monitor for a PDSCH in each slot and send HARQ feedback for slots in which PDSCH was not detected. This assumes that priority bits for all PDSCHs in the multiple slots are communicated to the UE. Transmitting this information, however, can lead to a wastage of DCI and uplink control information (UCI) bits for PDSCHs that are not transmitted. To address this, aspects may enable the gNB to send priority bits for a subset of the PDSCHs (e.g., the transmitted PDSCHs) and an indication of the total downlink assignment indication (DAI) to help the UE track the transmitted PDSCHs.

Figure 9:
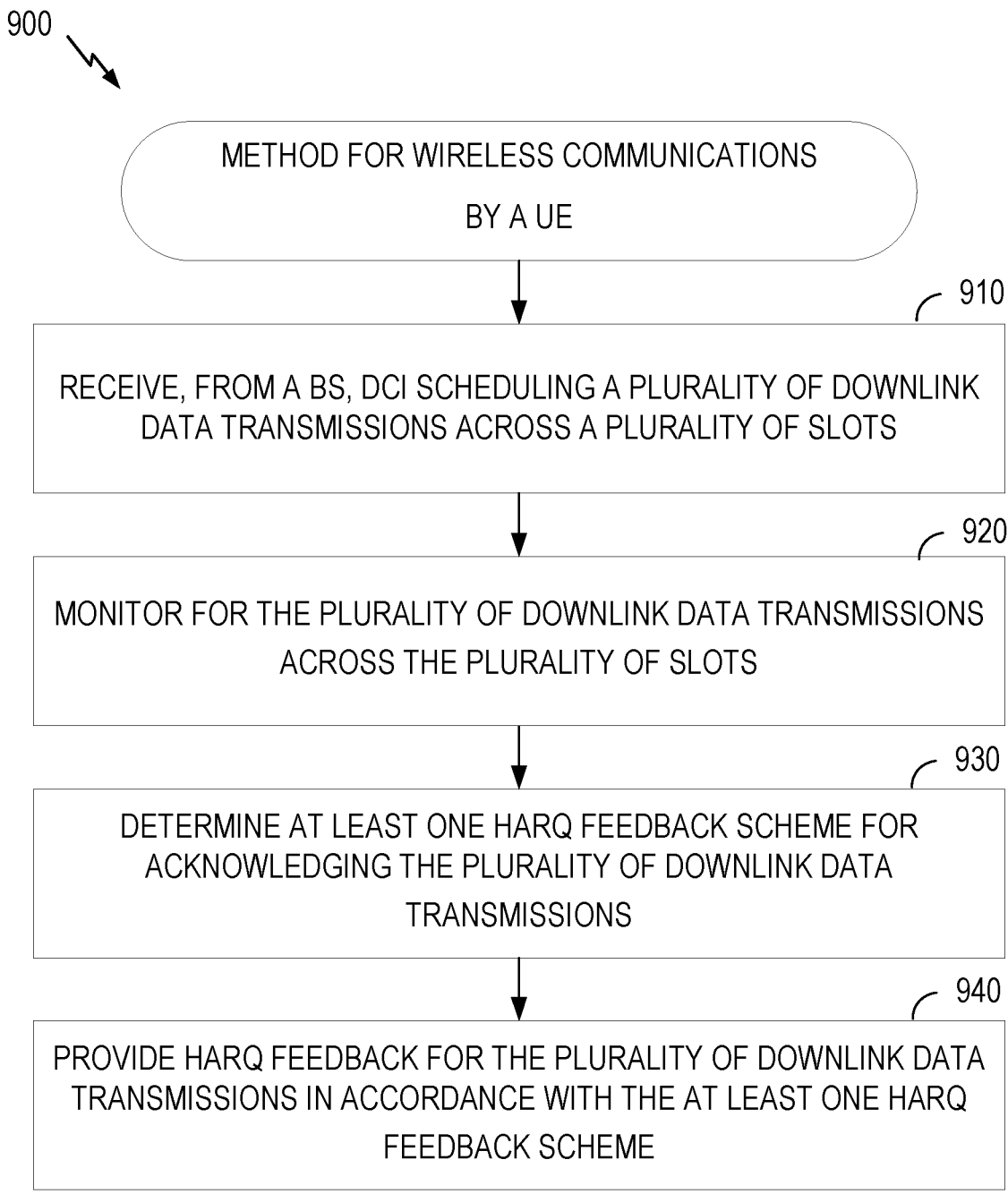
FIG. 9 is a flow diagram of an example operations for wireless communications by a user equipment, in accordance with certain aspects of the present disclosure.

FIG. 9 is a flow diagram of example operations 900 for wireless communications, in accordance with certain aspects of the present disclosure. The operations 900 may be performed by a UE (e.g., UE 104).

Operations 900 may begin at 910, where the UE receives, from a BS (e.g., BS 102), DCI (e.g., DCI within PDCCH 602) scheduling a plurality of downlink data transmissions (e.g., PDSCHs 604) across a plurality of slots. At 920, the UE monitors for the plurality of downlink data transmissions across the plurality of slots. At 930, the UE determines at least one HARQ feedback scheme (e.g., HARQ feedback scheme 600, HARQ feedback scheme 700, HARQ feedback scheme 800) for acknowledging the plurality of downlink data transmissions. At 940, the UE provides HARQ feedback for the plurality of downlink data transmissions in accordance with the at least one HARQ feedback scheme.

In some aspects, the HARQ feedback scheme (e.g., HARQ feedback scheme 600) determined at 930 is based on a single PUCCH resource (e.g., PUCCH resource 610) for providing the HARQ feedback. As noted above, for example, the HARQ feedback scheme 600 may involve using the single PUCCH resource to carry the individual HARQ-ACKs (e.g., HARQ-ACKs 608) as a group or block. The UE can multiplex the individual HARQ-ACKs (e.g., HARQ-ACKs 608) for the PDSCHs 604 into the single PUCCH resource, as opposed to using a separate PUCCH resource for each of the individual HARQ-ACKs. In these aspects, the UE (at 940) may provide the HARQ feedback by transmitting the HARQ feedback within the single PUCCH resource to the BS, where the HARQ feedback includes a plurality of bits and each bit corresponds to a different one of the plurality of downlink data transmissions.

In some aspects, when the HARQ feedback scheme is based on a single PUCCH resource (e.g., HARQ feedback scheme 600), the operations 900 may further include the UE receiving, from the BS, a retransmission of at least one of the plurality of downlink data transmissions, where the retransmission is scheduled by another scheduling DCI (e.g., separate from the DCI received in 910) from the BS.

In some aspects, when the HARQ feedback scheme is based on a single PUCCH resource (e.g., HARQ feedback scheme 600), at least one of the plurality of downlink data transmissions may include a retransmission of a first downlink data transmission. In these aspects, the retransmission of the first downlink data transmission is scheduled by the same DCI (in 910).

In some aspects, the HARQ feedback scheme (e.g., HARQ feedback scheme 700) determined at 930 is based on an encoding scheme for providing the HARQ feedback. As noted above, for example, the HARQ feedback scheme 700 may involve using the encoding scheme to jointly encode the individual HARQ-ACKs (e.g., HARQ-ACKs 608) into a joint HARQ-ACK (e.g., joint HARQ-ACK 702). In these aspects, the UE (at 940) may provide the HARQ feedback by generating the joint HARQ-ACK, based on the encoding scheme, and by transmitting the joint HARQ-ACK to the BS. The number of bits of the joint HARQ-ACK may be less than a total number of bits of the HARQ feedback.

In some aspects, when the joint HARQ-ACK indicates at least one NACK for at least one of the plurality of downlink data transmissions, the operations 900 may further include the UE receiving, from the BS, a retransmission of the plurality of downlink data transmissions, after transmitting the joint HARQ-ACK.

In some aspects, the HARQ feedback scheme (e.g., HARQ feedback scheme 800) determined at 930 is based on (i) at least one encoding scheme for providing the HARQ feedback and (ii) a single PUCCH resource for providing the HARQ feedback. As noted above, for example, the HARQ feedback scheme 800 may involve dividing the plurality of downlink data transmissions into one or more groups (e.g., groups 802), generating a joint HARQ-ACK (e.g., joint HARQ-ACK 804) for each group by jointly encoding the individual HARQ-ACKs for each downlink data transmission within the group using the encoding scheme, and transmitting the generated joint HARQ-ACKs as a group or block within the single PUCCH resource (e.g., PUCCH resource 810).

In aspects where the HARQ feedback scheme determined at 930 is the HARQ feedback scheme 800, the UE (at 940) may generate a joint HARQ-ACK for each of one or more groups of the plurality of downlink data transmissions, based on the at least one encoding scheme, and transmit the generated joint HARQ-ACKs within the single PUCCH resource to the BS. Each joint HARQ-ACK can include an indication of HARQ-ACK feedback for a subset of the plurality of downlink data transmissions. For each joint HARQ-ACK, a total number of bits of the joint HARQ-ACK may be less than a total number of bits of the HARQ feedback for the subset of the plurality of downlink data transmissions.

In some aspects, when at least a first generated HARQ-ACK indicates at least one NACK for at least one downlink data transmission in a first group, the operations 900 may further include the UE receiving a retransmission of each of the downlink data transmissions in the first group, after transmitting the generated joint HARQ-ACKs, including the first generated HARQ-ACK.

In some aspects, the plurality of downlink data transmissions may include a first group of downlink data transmissions and a second group of downlink data transmissions, and at least one of the first group of downlink data transmissions and the second group of downlink data transmissions may include retransmissions of downlink data transmissions. In these aspects, the retransmissions would be scheduled by the same scheduling DCI (in 910).

In some aspects, the at least one HARQ feedback scheme (in 930) may be determined based on at least one of: (i) a time arrival of each of the plurality of downlink data transmissions, (ii) a priority of each of the plurality of downlink data transmissions, (iii) a type of transmit beam used for each of the plurality of downlink data transmissions, (iv) a modulation and coding scheme (MCS) associated with each of the plurality of downlink data transmissions, (v) a number of spatial streams used for each of the plurality of downlink data transmissions, or (vi) whether each of the plurality of downlink data transmissions is associated with a single user or multiple users.

In some aspects, the at least one HARQ feedback scheme (in 930) is determined based on an explicit indication from the BS. The explicit indication, for example, can be received in the scheduling DCI (in 910). In some aspects, the at least one HARQ feedback scheme (in 930) is determined based on at least one index associated with the plurality of downlink data transmissions, where the at least one index is associated with one of a plurality of HARQ feedback schemes. In some aspects, the at least one HARQ feedback scheme (in 930) is determined based on a number of repetitions of one or more of the plurality of downlink data transmissions. The number of repetitions, for example, can be indicated via a number of TCI states (via the scheduling DCI).

In some aspects, the scheduling DCI (in 910) may include a total DAI. In these aspects, the UE at 940 may acknowledge the plurality of downlink data transmissions based on the total DAI. For example, as noted, the UE can use the total DAI to keep track of the PDSCHs that have been transmitted by the network.

Figure 10:
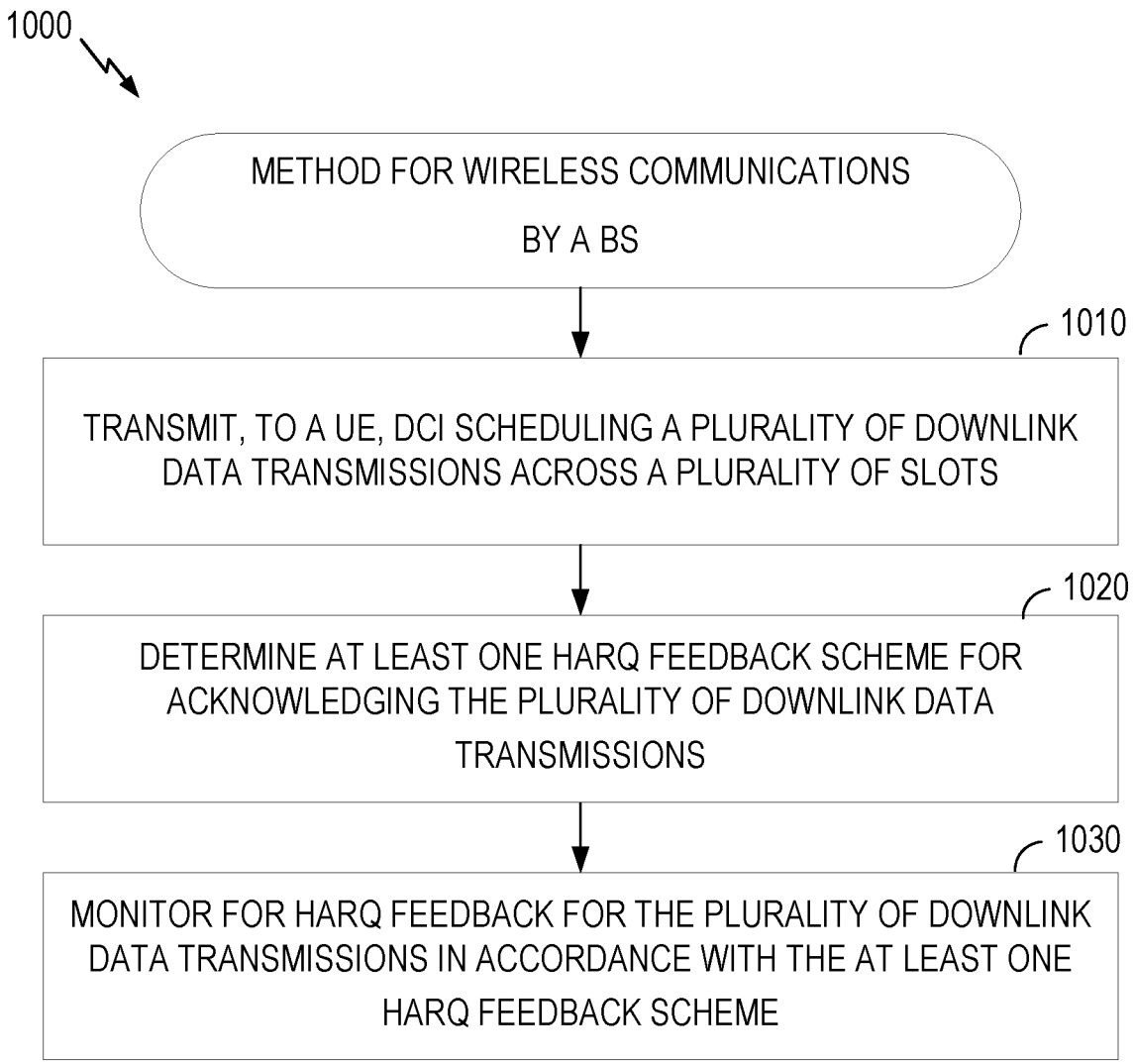
FIG. 10 is a flow diagram of an example operations for wireless communications by a user equipment, in accordance with certain aspects of the present disclosure.

FIG. 10 is a flow diagram of example operations 1000 for wireless communications, in accordance with certain aspects of the present disclosure. The operations 1000 may be performed by a BS (e.g., BS 102, such as a gNB).

Operations 1000 may begin at 1010, where the BS transmits, to a UE (e.g., UE 104), a DCI (e.g., within PDCCH 602) scheduling a plurality of downlink data transmissions (e.g., PDSCHs 604) across a plurality of slots. At 1020, the BS determines at least one HARQ feedback scheme (e.g., HARQ feedback scheme 600, HARQ feedback scheme 700, HARQ feedback scheme 800) for acknowledging the plurality of downlink data transmissions. At 1030, the BS monitors for HARQ feedback for the plurality of downlink data transmissions in accordance with the at least one HARQ feedback scheme.

In some aspects, the HARQ feedback scheme (e.g., HARQ feedback scheme 600) determined at 1020 is based on a single PUCCH resource (e.g., PUCCH resource 610) for the HARQ feedback. As noted above, for example, the HARQ feedback scheme 600 may involve using the single PUCCH resource to carry the individual HARQ-ACKs (e.g., HARQ-ACKs 608) as a group or block. The UE can multiplex the individual HARQ-ACKs (e.g., HARQ-ACKs 608) for the PDSCHs 604 into the single PUCCH resource, as opposed to using a separate PUCCH resource for each of the individual HARQ-ACKs. In these aspects, the BS (at 1030) may monitor for the HARQ feedback by monitoring within the single PUCCH resource for the HARQ feedback, where the HARQ feedback includes a plurality of bits and each bit corresponds to a different one of the plurality of downlink data transmissions.

In some aspects, when the HARQ feedback scheme is based on a single PUCCH resource (e.g., HARQ feedback scheme 600), the operations 1000 may further include the BS transmitting, to the UE, another DCI (e.g., separate from the DCI transmitted at 1010) scheduling a retransmission of at least one of the plurality of downlink data transmissions.

In some aspects, when the HARQ feedback scheme is based on a single PUCCH resource (e.g., HARQ feedback scheme 600), at least one of the plurality of downlink data transmissions may include a retransmission of a first downlink data transmission. In these aspects, the retransmission of the first downlink data transmission is scheduled by the same DCI (in 1010).

In some aspects, the HARQ feedback scheme (e.g., HARQ feedback scheme 700) determined at 1020 is based on an encoding scheme for the HARQ feedback. As noted above, for example, the HARQ feedback scheme 700 may involve using the encoding scheme to jointly encode the individual HARQ-ACKs (e.g., HARQ-ACKs 608) into a joint HARQ-ACK (e.g., joint HARQ-ACK 702). In these aspects, the BS (at 1030) may monitor for a joint HARQ-ACK for the plurality of downlink data transmissions, where the joint HARQ-ACK is generated based on jointly encoding the HARQ feedback based on the encoding scheme. The number of bits of the joint HARQ-ACK may be less than a total number of bits of the HARQ feedback.

In some aspects, when the joint HARQ-ACK indicates at least one NACK for at least one of the plurality of downlink data transmissions, the operations 1000 may further include scheduling a retransmission of the plurality of downlink data transmissions, after receiving the joint HARQ-ACK.

In some aspects, the HARQ feedback scheme (e.g., HARQ feedback scheme 800) determined at 1020 is based on (i) at least one encoding scheme for the HARQ feedback and (ii) a single PUCCH resource for providing the HARQ feedback. As noted above, for example, the HARQ feedback scheme 800 may involve dividing the plurality of downlink data transmissions into one or more groups (e.g., groups 802), generating a joint HARQ-ACK (e.g., joint HARQ-ACK 804) for each group by jointly encoding the individual HARQ-ACKs for each downlink data transmission within the group using the encoding scheme, and transmitting the generated joint HARQ-ACKs as a group or block within the single PUCCH resource (e.g., PUCCH resource 810).

In aspects where the HARQ feedback scheme determined at 1020 is the HARQ feedback scheme 800, the BS (at 1030) may monitor for a plurality of joint HARQ-ACKs within the single PUCCH resource, where each joint HARQ-ACK corresponds to a different group of the plurality of downlink data transmissions and is generated based on jointly encoding the HARQ feedback for the group of the plurality of downlink data transmissions using the at least one encoding scheme. Each joint HARQ-ACK may include an indication of HARQ feedback for the respective group of the plurality of downlink data transmissions. A total number of bits of the joint HARQ-ACK may be less than a total number of bits of the HARQ feedback for the group of the plurality of downlink data transmissions.

In some aspects, when at least a first generated joint HARQ-ACK indicates at least one NACK for at least one downlink data transmission in a first group, the operations 1000 may further include the BS scheduling a retransmission of each of the downlink data transmissions in the first group, after receiving the joint HARQ-ACKs, including the first generated joint HARQ-ACK.

In some aspects, the plurality of downlink data transmissions may include a first group of downlink data transmissions and a second group of downlink data transmissions, and at least one of the first group of downlink data transmissions and the second group of downlink data transmissions may include retransmissions of downlink data transmissions. In these aspects, the retransmissions would be scheduled by the same scheduling DCI (in 1010).

In some aspects, the at least one HARQ feedback scheme (in 1020) may be determined based on at least one of: (i) a time arrival of each of the plurality of downlink data transmissions, (ii) a priority of each of the plurality of downlink data transmissions, (iii) a type of transmit beam used for each of the plurality of downlink data transmissions, (iv) a modulation and coding scheme (MCS) associated with each of the plurality of downlink data transmissions, (v) a number of spatial streams used for each of the plurality of downlink data transmissions, or (vi) whether each of the plurality of downlink data transmissions is associated with a single user or multiple users.

In some aspects, the operations 1000 may further include the BS transmitting an indication of the at least one HARQ feedback scheme to the UE (e.g., within the scheduling DCI). In some aspects, the at least one HARQ feedback scheme (in 1020) is determined based on at least one index associated with the plurality of downlink data transmissions, where the at least one index is associated with one of a plurality of HARQ feedback schemes. The at least one index may be transmitted within the scheduling DCI. In some aspects, the scheduling DCI (in 1010) may include a total DAI and an indication of a priority for a subset of the PDSCHs.

Example Wireless Communication Devices

Figure 11:
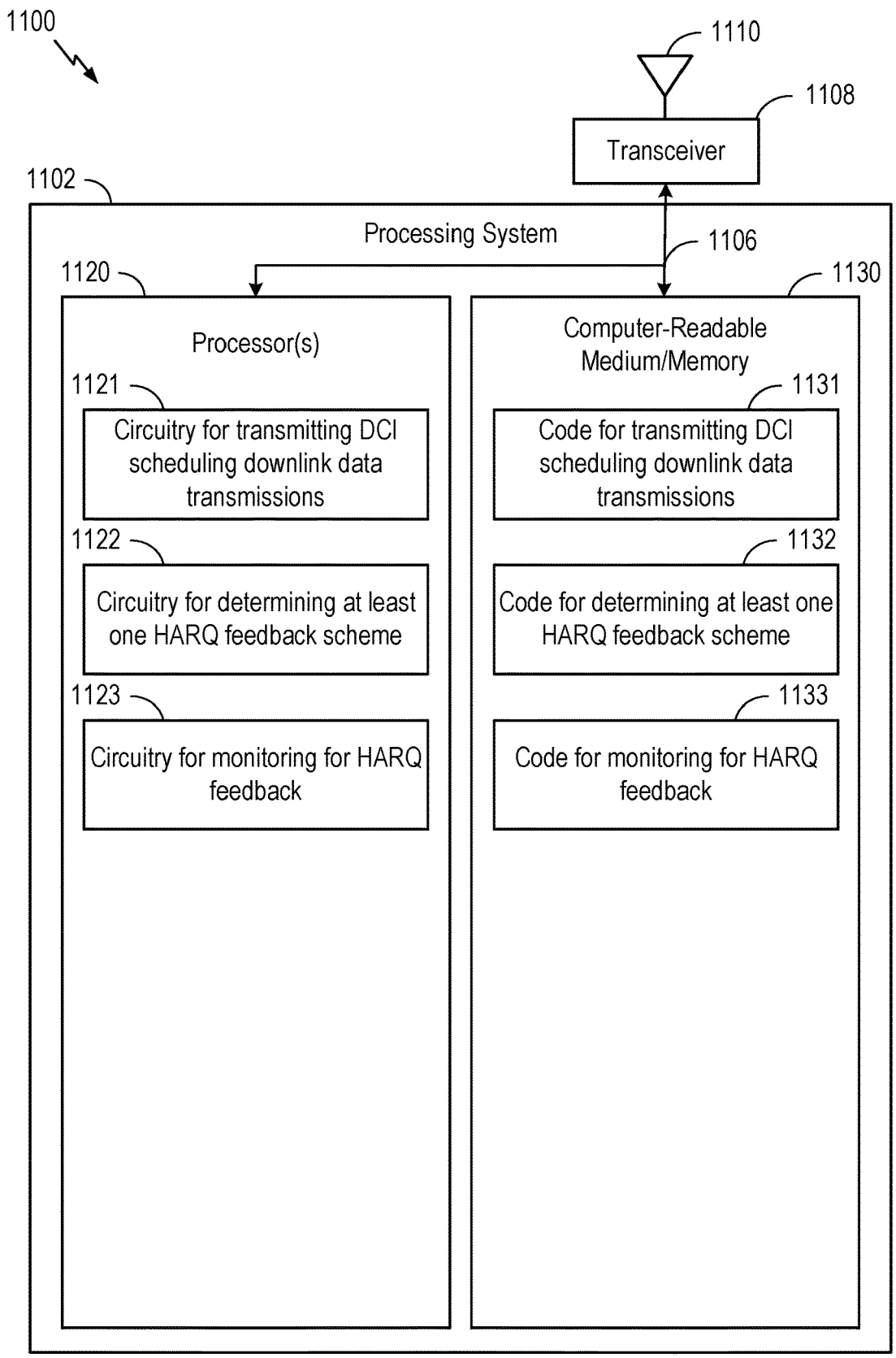
FIG. 11 depicts aspects of an example communications device, in accordance with certain aspects of the present disclosure.

FIG. 11 depicts an example communications device 1100 that includes various components operable, configured, or adapted to perform operations for the techniques disclosed herein, such as the operations depicted and described with respect to FIG. 10. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIG. 10, or other operations for performing the various techniques discussed herein.

In the depicted example, computer-readable medium/memory 1130 stores code 1131 for transmitting, to a UE, a DCI scheduling a plurality of downlink data transmissions across a plurality of slots; a code 1132 for determining at least one HARQ feedback scheme for acknowledging the plurality of downlink data transmissions; and a code 1133 for monitoring for HARQ feedback for the plurality of downlink data transmissions in accordance with the at least one HARQ feedback scheme.

In the depicted example, the one or more processors 1120 include circuitry configured to implement the code stored in the computer-readable medium/memory 1120, including circuitry 1121 for transmitting, to a UE, a DCI scheduling a plurality of downlink data transmissions across a plurality of slots; circuitry 1122 for determining at least one HARQ feedback scheme for acknowledging the plurality of downlink data transmissions; and circuitry 1123 for monitoring for HARQ feedback for the plurality of downlink data transmissions in accordance with the at least one HARQ feedback scheme.

Various components of communications device 1100 may provide means for performing the methods described herein, including with respect to FIG. 10.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for determining, means for generating, and means for monitoring may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including HARQ component 199).

Notably, FIG. 11 is just use example, and many other examples and configurations of communication device 1100 are possible.

Figure 12:
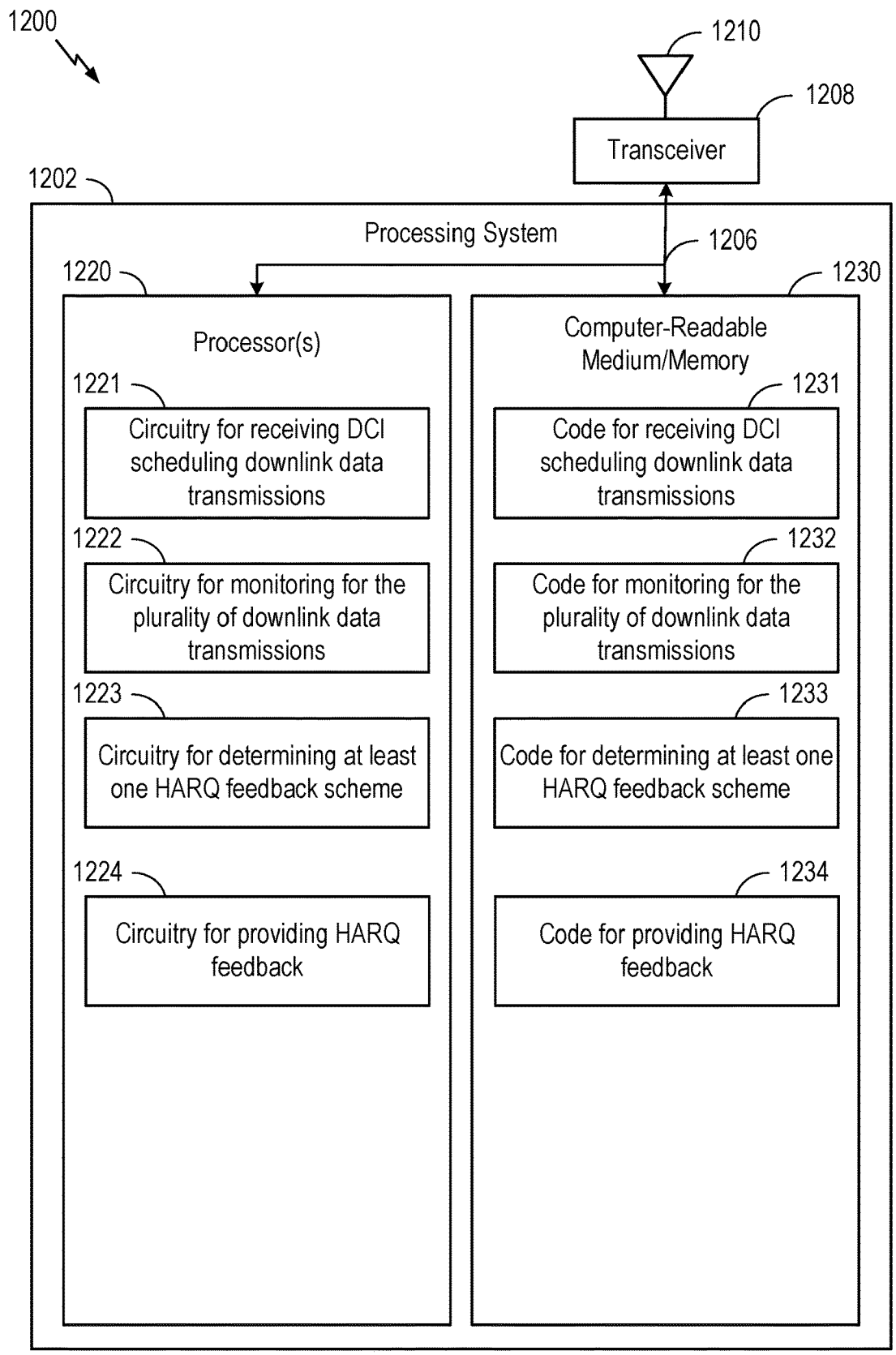
FIG. 12 depicts aspects of another example communications device, in accordance with certain aspects of the present disclosure.

FIG. 12 depicts an example communications device 1200 that includes various components operable, configured, or adapted to perform operations for the techniques disclosed herein, such as the operations depicted and described with respect to FIG. 9. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 9, or other operations for performing the various techniques discussed herein.

In the depicted example, computer-readable medium/memory 1230 stores code 1231 for receiving, from a BS, DCI scheduling a plurality of downlink data transmissions across a plurality of slots; code 1232 for monitoring for the plurality of downlink data transmissions across the plurality of slots; code 1233 for determining at least one HARQ feedback scheme for acknowledging the plurality of downlink data transmissions; and code 1234 for providing HARQ feedback for the plurality of downlink data transmissions in accordance with the at least one HARQ feedback scheme.

In the depicted example, the one or more processors 1220 include circuitry configured to implement the code stored in the computer-readable medium/memory 1230, including circuitry 1221 for receiving, from a BS, DCI scheduling a plurality of downlink data transmissions across a plurality of slots; circuitry 1222 for monitoring for the plurality of downlink data transmissions across the plurality of slots; circuitry 1223 for determining at least one HARQ feedback scheme for acknowledging the plurality of downlink data transmissions; and circuitry 1224 for providing HARQ feedback for the plurality of downlink data transmissions in accordance with the at least one HARQ feedback scheme.

Various components of communications device 1200 may provide means for performing the methods described herein, including with respect to FIG. 9.

In some examples, means for transmitting or sending or providing (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for monitoring, means for generating, and means for determining may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including HARQ component 198).

Notably, FIG. 12 is just use example, and many other examples and configurations of communication device 1200 are possible.

EXAMPLE CLAUSES

Implementation examples are described in the following numbered clauses:

Clause 1: A method for wireless communications by a user equipment (UE), comprising: receiving, from a base station (BS), downlink control information (DCI) scheduling a plurality of downlink data transmissions across a plurality of slots; monitoring for the plurality of downlink data transmissions across the plurality of slots; determining at least one hybrid automatic repeat request (HARQ) feedback scheme for acknowledging the plurality of downlink data transmissions; and providing HARQ feedback for the plurality of downlink data transmissions in accordance with the at least one HARQ feedback scheme.

Clause 2: The method of Clause 1, wherein the HARQ feedback scheme is based on a single physical uplink control channel (PUCCH) resource for providing the HARQ feedback.

Clause 3: The method of Clause 2, wherein: the HARQ feedback comprises a plurality of bits, each of the bits corresponding to a different one of the plurality of downlink data transmissions; and providing the HARQ feedback comprises transmitting the HARQ feedback within the single PUCCH resource to the BS.

Clause 4: The method of any of Clauses 1-3, wherein at least one of the plurality of downlink data transmissions comprises a retransmission of a first downlink data transmission.

Clause 5: The method of any of Clauses 1-4, further comprising receiving, from the BS, a retransmission of at least one of the plurality of downlink data transmissions, wherein the retransmission is scheduled by another scheduling DCI from the BS.

Clause 6: The method of Clause 1, wherein the HARQ feedback scheme is based on an encoding scheme for providing the HARQ feedback.

Clause 7: The method of Clause 6, wherein providing the HARQ feedback comprises: generating a joint HARQ-ACK for the plurality of downlink data transmissions, based on jointly encoding the HARQ feedback using the encoding scheme; and transmitting the joint HARQ-ACK to the BS.

Clause 8: The method of Clause 7, wherein a number of bits of the joint HARQ-ACK is less than a total number of bits of the HARQ feedback.

Clause 9: The method of any of Clauses 1 and 6-8, wherein the joint HARQ-ACK indicates at least one negative acknowledgement for at least one of the plurality of downlink data transmissions.

Clause 10: The method of any of Clauses 1 and 6-9, further comprising receiving a retransmission of the plurality of downlink data transmissions, after transmitting the joint HARQ-ACK.

Clause 11: The method of Clause 1, wherein the HARQ feedback scheme is based on: (i) at least one encoding scheme for providing the HARQ feedback and (ii) a single physical uplink control channel (PUCCH) resource for providing the HARQ feedback.

Clause 12: The method of Clause 11, wherein providing the HARQ feedback comprises: generating a joint HARQ-ACK for each of one or more groups of the plurality of downlink data transmissions, based on the at least one encoding scheme; and transmitting the generated joint HARQ-ACKs within the single PUCCH resource to the base station.

Clause 13: The method of Clause 12, wherein each joint HARQ-ACK comprises an indication of HARQ feedback for a subset of the plurality of downlink data transmissions.

Clause 14: The method of any of Clauses 1 and 11-13, wherein a total number of bits of the joint HARQ-ACK is less than a total number of bits of the HARQ feedback for the subset of the plurality of downlink data transmissions.

Clause 15: The method of any of Clauses 1 and 11-14, wherein a first generated joint HARQ-ACK indicates at least one negative acknowledgement for at least one downlink data transmission in a first group.

Clause 16: The method of any of Clauses 1 and 11-15, further comprising receiving a retransmission of each of the downlink data transmissions in the first group, after transmitting the generated joint HARQ-ACKs, including the first generated joint HARQ-ACK.

Clause 17: The method of any of Clauses 1 and 11-16, wherein: the plurality of downlink data transmissions comprises a first group of downlink data transmissions and a second group of downlink data transmissions; and at least one of the first group of downlink data transmissions and the second group of downlink data transmissions comprises retransmissions of downlink data transmissions.

Clause 18: The method of any one of Clauses 1-17, wherein the at least one HARQ feedback scheme is determined based on at least one of: (i) a time arrival of each of the plurality of downlink data transmissions, (ii) a priority of each of the plurality of downlink data transmissions, (iii) a type of transmit beam used for each of the plurality of downlink data transmissions, (iv) a modulation and coding scheme (MCS) associated with each of the plurality of downlink data transmissions, (v) a number of spatial streams used for each of the plurality of downlink data transmissions, or (vi) whether each of the plurality of downlink data transmissions is associated with a single user or multiple users.

Clause 19: The method of any one of Clauses 1-18, wherein the at least one HARQ feedback scheme is determined based on an explicit indication from the BS.

Clause 20: The method of any one of Clauses 1-19, wherein: the at least one HARQ feedback scheme is determined based on at least one index associated with the plurality of downlink data transmissions; and the at least one index is associated with one of a plurality of HARQ feedback schemes.

Clause 21: The method of any one of Clauses 1-20, wherein the at least one HARQ feedback scheme is determined based on a number of repetitions of one or more of the plurality of downlink data transmissions.

Clause 22: The method of Clause 21, wherein the number of repetitions is indicated via a number of transmission configuration indicator (TCI) states.

Clause 23: The method of any one of Clauses 1-22, wherein: the scheduling DCI comprises a total downlink assignment indication (DAI); and the plurality of downlink data transmissions are acknowledged further based on the total DAI.

Clause 24: An apparatus comprising: a memory comprising computer-executable instructions; and one or more processors configured to execute the computer-executable instructions and cause the apparatus to perform a method in accordance with any one of Clauses 1-23.

Clause 25: An apparatus comprising: means for performing a method in accordance with any one of claims 1-23.

Clause 26: A non-transitory computer-readable medium comprising computer-executable instructions that, when executed by one or more processors of a processing system, cause the processing system to perform a method in accordance with any one of claims 1-23.

Clause 27: A method for wireless communications by a base station (BS), comprising: transmitting, to a user equipment (UE), downlink control information (DCI) scheduling a plurality of downlink data transmissions across a plurality of slots; determining at least one hybrid automatic repeat request (HARQ) feedback scheme for acknowledging the plurality of downlink data transmission; and monitoring for HARQ feedback for the plurality of downlink data transmissions in accordance with the at least one HARQ feedback scheme.

Clause 28: The method of Clause 27, wherein the HARQ feedback scheme is based on a single physical uplink control channel (PUCCH) resource for the HARQ feedback.

Clause 29: The method of Clause 28, wherein: the HARQ feedback comprises a plurality of bits, each of the bits corresponding to a different one of the plurality of downlink data transmissions; and monitoring for the HARQ feedback comprises monitoring within the single PUCCH resource for the HARQ feedback.

Clause 30: The method of any one of Clauses 27-29, wherein at least one of the plurality of downlink data transmissions comprises a retransmission of a first downlink data transmission.

Clause 31: The method of any one of Clauses 27-30, further comprising transmitting, to the UE, another DCI scheduling a retransmission of at least one of the plurality of downlink data transmissions.

Clause 32: The method of Clause 27, wherein the HARQ feedback scheme is based on an encoding scheme for the HARQ feedback.

Clause 33: The method of Clause 32, wherein: monitoring for a joint HARQ-ACK for the plurality of downlink data transmissions; and the joint HARQ-ACK is generated based on jointly encoding the HARQ feedback using the encoding scheme.

Clause 34: The method of Clause 33, wherein a number of bits of the joint HARQ-ACK is less than a total number of bits of the HARQ feedback.

Clause 35: The method of any one of Clauses 27 and 32-34, wherein the joint HARQ-ACK indicates at least one negative acknowledgement for at least one of the plurality of downlink data transmissions.

Clause 36: The method of any one of Clauses 27 and 32-35, further comprising scheduling a retransmission of the plurality of downlink data transmissions, after receiving the joint HARQ-ACK.

Clause 37: The method of Clause 27, wherein the HARQ feedback scheme is based on: (i) at least one encoding scheme for the HARQ feedback and (ii) a single physical uplink control channel (PUCCH) resource for the HARQ feedback.

Clause 38: The method of Clause 37, wherein monitoring for the HARQ feedback comprises monitoring for a plurality of joint HARQ-ACKs within the single PUCCH resource, each joint HARQ-ACK corresponding to a different group of the plurality of downlink data transmissions and being generated based on jointly encoding the HARQ feedback for the group of the plurality of downlink data transmissions using the at least one encoding scheme.

Clause 39: The method of Clause 38, wherein each joint HARQ-ACK comprises an indication of HARQ feedback for the respective group of the plurality of downlink data transmissions.

Clause 40: The method of Clause 39, wherein a total number of bits of the joint HARQ-ACK is less than a total number of bits of the HARQ feedback for the group of the plurality of downlink data transmissions.

Clause 41: The method of any one of Clauses 27 and 37-40, wherein a first generated joint HARQ-ACK indicates at least one negative acknowledgement for at least one downlink data transmission in a first group.

Clause 42: The method of any one of Clauses 27 and 37-41, further comprising scheduling a retransmission of each of the downlink data transmissions in the first group, after receiving the joint HARQ-ACKs, including the first generated joint HARQ-ACK.

Clause 43: The method of any one of Clauses 27 and 37-42, wherein: the plurality of downlink data transmissions comprises a first group of downlink data transmissions and a second group of downlink data transmissions; and at least one of the first group of downlink data transmissions and the second group of downlink data transmissions comprises retransmissions of downlink data transmissions.

Clause 44: The method of Clause 27, wherein the at least one HARQ feedback scheme is determined based on at least one of: (i) a time arrival of each of the plurality of downlink data transmissions, (ii) a priority of each of the plurality of downlink data transmissions, (iii) a type of transmit beam used for each of the plurality of downlink data transmissions, (iv) a modulation and coding scheme (MCS) associated with each of the plurality of downlink data transmissions, (v) a number of spatial streams used for each of the plurality of downlink data transmissions, or (vi) whether each of the plurality of downlink data transmissions is associated with a single user or multiple users.

Clause 45: The method of any one of Clauses 27-44, further comprising transmitting an indication of the at least one HARQ feedback scheme to the UE.

Clause 46: The method of any one of Clauses 27-45, wherein: the at least one HARQ-ACK feedback scheme is determined based on at least one index associated with the plurality of downlink data transmissions; and the at least one index is associated with one of a plurality of HARQ-ACK feedback schemes.

Clause 47: The method of any one of Clauses 27-46, wherein: the scheduling DCI comprises a total downlink assignment indication (DAI) and an indication of a priority associated with each of a subset of the plurality of downlink data transmissions.

Clause 48: An apparatus comprising: a memory comprising computer-executable instructions; and one or more processors configured to execute the computer-executable instructions and cause the apparatus to perform a method in accordance with any one of Clauses 27-47.

Clause 49: An apparatus comprising: means for performing a method in accordance with any one of Clauses 27-47.

Clause 50: A non-transitory computer-readable medium comprising computer-executable instructions that, when executed by one or more processors of a processing system, cause the processing system to perform a method in accordance with any one of Clauses 27-47.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of providing HARQ feedback for multiple PDSCH transmissions across multiple slots in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus comprising:
 a memory comprising computer-executable instructions; and
 one or more processors configured to execute the computer-executable instructions and cause the apparatus to:
  receive, from a base station (BS), downlink control information (DCI) scheduling a plurality of downlink data transmissions across a plurality of slots;
  monitor for the plurality of downlink data transmissions across the plurality of slots;
  determine at least one hybrid automatic repeat request (HARQ) feedback scheme for acknowledging the plurality of downlink data transmissions, wherein the at least one HARQ feedback scheme is determined based on a respective one or more conditions associated with each of the plurality of downlink data transmissions, and the one or more conditions comprise a type of transmit beam used for each of the plurality of downlink data transmissions; and
  provide HARQ feedback for the plurality of downlink data transmissions in accordance with the at least one HARQ feedback scheme.

2. The apparatus of claim 1, wherein the at least one HARQ feedback scheme is based on a single physical uplink control channel (PUCCH) resource for providing the HARQ feedback.

3. The apparatus of claim 2, wherein:
 the HARQ feedback comprises a plurality of bits, each of the bits corresponding to a different one of the plurality of downlink data transmissions; and
 in order to provide the HARQ feedback, the one or more processors are configured to cause the apparatus to transmit the HARQ feedback within the single PUCCH resource to the BS.

4. The apparatus of claim 2, wherein at least one of the plurality of downlink data transmissions comprises a retransmission of a first downlink data transmission.

5. The apparatus of claim 2, wherein the one or more processors are further configured to cause the apparatus to receive, from the BS, a retransmission of at least one of the plurality of downlink data transmissions, wherein the retransmission is scheduled by another scheduling DCI from the BS.

6. The apparatus of claim 1, wherein the at least one HARQ feedback scheme is based on an encoding scheme for providing the HARQ feedback.

7. The apparatus of claim 6, wherein in order to provide the HARQ feedback, the one or more processors are configured to cause the apparatus to:
 generate a joint HARQ-ACK for the plurality of downlink data transmissions, based on jointly encoding the HARQ feedback using the encoding scheme; and
 transmit the joint HARQ-ACK to the BS.

8. The apparatus of claim 7, wherein a number of bits of the joint HARQ-ACK is less than a total number of bits of the HARQ feedback.

9. The apparatus of claim 7, wherein the joint HARQ-ACK indicates at least one negative acknowledgement for at least one of the plurality of downlink data transmissions.

10. The apparatus of claim 9, wherein the one or more processors are further configured to cause the apparatus to receive a retransmission of the plurality of downlink data transmissions, after transmitting the joint HARQ-ACK.

11. The apparatus of claim 1, wherein the at least one HARQ feedback scheme is based on: (i) at least one encoding scheme for providing the HARQ feedback and (ii) a single physical uplink control channel (PUCCH) resource for providing the HARQ feedback.

12. The apparatus of claim 11, wherein in order to provide the HARQ feedback, the one or more processors are configured to cause the apparatus to:
 generate a joint HARQ-ACK for each of one or more groups of the plurality of downlink data transmissions, based on the at least one encoding scheme; and
 transmit the generated joint HARQ-ACKs within the single PUCCH resource to the base station.

13. The apparatus of claim 12, wherein each joint HARQ-ACK comprises an indication of HARQ feedback for a subset of the plurality of downlink data transmissions.

14. The apparatus of claim 13, wherein a total number of bits of the joint HARQ-ACK is less than a total number of bits of the HARQ feedback for the subset of the plurality of downlink data transmissions.

15. The apparatus of claim 12, wherein a first generated joint HARQ-ACK indicates at least one negative acknowledgement for at least one downlink data transmission in a first group.

16. The apparatus of claim 15, wherein the one or more processors are further configured to cause the apparatus to receive a retransmission of each downlink data transmission in the first group, after transmission of the generated joint HARQ-ACKs, including the first generated joint HARQ-ACK.

17. The apparatus of claim 12, wherein:
 the plurality of downlink data transmissions comprises a first group of downlink data transmissions and a second group of downlink data transmissions; and
 at least one of the first group of downlink data transmissions and the second group of downlink data transmissions comprises retransmissions of downlink data transmissions.

18. The apparatus of claim 1, wherein the one or more conditions is further comprise at least one of: (i) a time arrival of each of the plurality of downlink data transmissions, (ii) a priority of each of the plurality of downlink data transmissions, (iii) a modulation and coding scheme (MCS) associated with each of the plurality of downlink data transmissions, (iv) a number of spatial streams used for each of the plurality of downlink data transmissions, or (v) whether each of the plurality of downlink data transmissions is associated with a single user or multiple users.

19. The apparatus of claim 1, wherein:
 the DCI comprises a total downlink assignment indication (DAI); and
 the plurality of downlink data transmissions are acknowledged further based on the total DAI.

20. A method for wireless communications by a user equipment (UE), comprising:
 receiving, from a base station (BS), downlink control information (DCI) scheduling a plurality of downlink data transmissions across a plurality of slots;
 monitoring for the plurality of downlink data transmissions across the plurality of slots;
 determining at least one hybrid automatic repeat request (HARQ) feedback scheme for acknowledging the plurality of downlink data transmissions based on a respective one or more conditions associated with each of the plurality of downlink data transmissions, wherein the one or more conditions comprise a type of transmit beam used for each of the plurality of downlink data transmissions; and providing HARQ feedback for the plurality of downlink data transmissions in accordance with the at least one HARQ feedback scheme.

21. The method of claim 20, wherein the at least one HARQ feedback scheme is based on a single physical uplink control channel (PUCCH) resource for providing the HARQ feedback.

22. The method of claim 20, wherein the at least one HARQ feedback scheme is based on an encoding scheme for providing the HARQ feedback.

23. The method of claim 20, wherein the at least one HARQ feedback scheme is based on: (i) at least one encoding scheme for providing the HARQ feedback and (ii) a single physical uplink control channel (PUCCH) resource for providing the HARQ feedback.

24. The method of claim 20, wherein at least one of the plurality of downlink data transmissions comprises a retransmission of a first downlink data transmission.

25. A non-transitory computer-readable medium comprising computer-executable instructions that, when executed by one or more processors of a processing system, cause the processing system to perform a method comprising:
receiving, from a base station (BS), downlink control information (DCI) scheduling a plurality of downlink data transmissions across a plurality of slots;
monitoring for the plurality of downlink data transmissions across the plurality of slots;
determining at least one hybrid automatic repeat request (HARQ) feedback scheme for acknowledging the plurality of downlink data transmissions, wherein the at least one HARQ feedback scheme is determined based on a respective one or more conditions associated with each of the plurality of downlink data transmissions, and the one or more conditions comprise a type of transmit beam used for each of the plurality of downlink data transmissions; and
providing HARQ feedback for the plurality of downlink data transmissions in accordance with the at least one HARQ feedback scheme.

26. An apparatus comprising:
a memory comprising computer-executable instructions; and
one or more processors configured to execute the computer-executable instructions and cause the apparatus to:
transmit, to a user equipment (UE), downlink control information (DCI) scheduling a plurality of downlink data transmissions across a plurality of slots;
determine at least one hybrid automatic repeat request (HARQ) feedback scheme for acknowledging the plurality of downlink data transmission based on a respective one or more conditions associated with each of the plurality of downlink data transmissions, wherein the one or more conditions comprise a type of transmit beam used for each of the plurality of downlink data transmissions; and
monitor for HARQ feedback for the plurality of downlink data transmissions in accordance with the at least one HARQ feedback scheme.

27. The apparatus of claim 26, wherein:
the at least one HARQ feedback scheme is based on a single physical uplink control channel (PUCCH) resource for the HARQ feedback;
the HARQ feedback comprises a plurality of bits, each of the bits corresponding to a different one of the plurality of downlink data transmissions; and
in order to monitor for the HARQ feedback, the one or more processors are configured to cause the apparatus to monitor within the single PUCCH resource for the HARQ feedback.

28. The apparatus of claim 26, wherein:
the at least one HARQ feedback scheme is based on an encoding scheme for the HARQ feedback;
in order to monitor for the HARQ feedback, the one or more processors are configured to cause the apparatus to monitor for a joint HARQ-ACK for the plurality of downlink data transmissions; and
the joint HARQ-ACK is generated based on jointly encoding the HARQ feedback using the encoding scheme.

29. The apparatus of claim 26, wherein:
the at least one HARQ feedback scheme is based on: (i) at least one encoding scheme for the HARQ feedback and (ii) a single physical uplink control channel (PUCCH) resource for the HARQ feedback; and
in order to monitor for the HARQ feedback, the one or more processors are configured to cause the apparatus to monitor for a plurality of joint HARQ-ACKs within the single PUCCH resource, each joint HARQ-ACK corresponding to a different group of the plurality of downlink data transmissions and being generated based on jointly encoding the HARQ feedback for the group of the plurality of downlink data transmissions using the at least one encoding scheme.

30. The apparatus of claim 26, wherein the one or more conditions further comprise at least one of: (i) a time arrival of each of the plurality of downlink data transmissions, (ii) a priority of each of the plurality of downlink data transmissions, (iii) a modulation and coding scheme (MCS) associated with each of the plurality of downlink data transmissions, (iv) a number of spatial streams used for each of the plurality of downlink data transmissions, or (v) whether each of the plurality of downlink data transmissions is associated with a single user or multiple users.

* * * * *